US012720092B2

(12) United States Patent
Zhao et al.

(10) Patent No.: US 12,720,092 B2
(45) **Date of Patent: *Aug. 25, 2026**

(54) IMPLICIT TRANSFORM SELECTION

(71) Applicant: TENCENT AMERICA LLC, Palo Alto, CA (US)

(72) Inventors: Xin Zhao, San Jose, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 18/486,827

(22) Filed: Oct. 13, 2023

(65) Prior Publication Data

US 2024/0048745 A1 Feb. 8, 2024

Related U.S. Application Data

(63) Continuation of application No. 17/449,879, filed on Oct. 4, 2021, now Pat. No. 11,831,889, which is a (Continued)

(51) Int. Cl.
*H04N 19/44* (2014.01)
*H04N 19/105* (2014.01)
(Continued)

(52) U.S. Cl.
CPC .......... *H04N 19/44* (2014.11); *H04N 19/105* (2014.11); *H04N 19/119* (2014.11);
(Continued)

(58) Field of Classification Search
CPC .................................................. H04N 19/44
(Continued)

(56) References Cited

U.S. PATENT DOCUMENTS 7,330,509 B2 2/2008 Lu et al.
7,983,496 B2 7/2011 Liu et al.
(Continued)

FOREIGN PATENT DOCUMENTS

CN 113950834 A 1/2022
CN 113994666 A 1/2022
(Continued)

OTHER PUBLICATIONS

Bross et al., "General Video Coding Technology in Responses to the Joint Call for Proposals on Video Compression with Capability beyond Hevc," IEEE Transactions on Circuits and Systems for Video Technology, May 2020, vol. 30, No. 5, pp. 1226-1240.
(Continued)

*Primary Examiner* — Amir Shahnami
(74) *Attorney, Agent, or Firm* — Aren Fox Schiff LLP

(57) ABSTRACT

In a method of processing visual media data, a conversion between a visual media file and a bitstream of visual media data is performed according to a format rule. The bitstream includes transform block signaling information and at least one of low-frequency non-separable transform (LFNST) information and matrix-based intra prediction mode (MIP) information. The transform block signaling information indicates an implicit transform scheme, the transform information indicates whether the LFNST is invalid, and the MIP information indicates whether the MIP is invalid. The format rule specifies that a primary transform type for a transform block is determined based on a size of the transform block responsive to the transform block signaling information indicating the implicit transform scheme and at least one of the LFNST information indicating the LFNST is invalid and the MIP information indicating the MIP is invalid.

20 Claims, 16 Drawing Sheets

Related U.S. Application Data continuation of application No. 16/883,545, filed on May 26, 2020, now Pat. No. 11,212,545.

(60) Provisional application No. 62/858,887, filed on Jun. 7, 2019.

(51) Int. Cl.

| | |
|---|---|
| ***H04N 19/119*** | (2014.01) |
| ***H04N 19/159*** | (2014.01) |
| ***H04N 19/176*** | (2014.01) |
| ***H04N 19/625*** | (2014.01) |

(52) U.S. Cl.
CPC ......... *H04N 19/159* (2014.11); *H04N 19/176* (2014.11); *H04N 19/625* (2014.11)

(58) Field of Classification Search
USPC .................................................... 375/240.25
See application file for complete search history.

(56) References Cited

U.S. PATENT DOCUMENTS

| | | | |
|---|---|---|---|
| 8,085,852 | B2 | 12/2011 | Liu et al. |
| 8,238,442 | B2 | 8/2012 | Liu |
| 8,526,495 | B2 | 9/2013 | Liu et al. |
| 9,049,452 | B2 | 6/2015 | Liu et al. |
| 9,769,472 | B2 | 9/2017 | Liu et al. |
| 9,788,019 | B2 | 10/2017 | Liu et al. |
| 10,136,144 | B2 | 11/2018 | Liu et al. |
| 10,205,968 | B2 | 2/2019 | Liu et al. |
| 10,397,569 | B2 | 8/2019 | Liu et al. |
| 10,432,929 | B2 | 10/2019 | Zhao et al. |
| 10,455,231 | B2 | 10/2019 | Xu et al. |
| 10,462,486 | B1 | 10/2019 | Zhao et al. |
| 10,511,834 | B2 | 12/2019 | Xu et al. |
| 10,536,720 | B2 | 1/2020 | Zhao et al. |
| 10,542,253 | B2 | 1/2020 | Liu et al. |
| 10,567,752 | B2 | 2/2020 | Zhao et al. |
| 10,567,801 | B2 | 2/2020 | Zhao et al. |
| 10,575,013 | B2 | 2/2020 | Liu et al. |
| 10,582,195 | B2 | 3/2020 | Liu et al. |
| 10,587,881 | B2 | 3/2020 | Xu et al. |
| 10,587,885 | B2 | 3/2020 | Ye et al. |
| 10,595,019 | B2 | 3/2020 | Chernyak et al. |
| 10,609,384 | B2 | 3/2020 | Chen et al. |
| 10,609,402 | B2 | 3/2020 | Zhao et al. |
| 10,609,403 | B2 | 3/2020 | Xu et al. |
| 2012/0201298 | A1 | 8/2012 | Panusopone et al. |
| 2013/0266074 | A1 | 10/2013 | Guo et al. |
| 2017/0150183 | A1 | 5/2017 | Zhang et al. |
| 2020/0296370 | A1* | 9/2020 | Egilmez ................. H04N 19/61 |

FOREIGN PATENT DOCUMENTS

| | | | |
|---|---|---|---|
| EA | 201791457 | A1 | 12/2017 |
| GB | 2501551 | A | 10/2013 |
| RU | 2627119 | C2 | 8/2017 |
| WO | 2017195555 | A1 | 11/2017 |
| WO | 2019009129 | A1 | 1/2019 |
| WO | 2019069782 | A1 | 4/2019 |
| WO | 2020130661 | A1 | 6/2020 |
| WO | 2020243258 | A1 | 12/2020 |

OTHER PUBLICATIONS

Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K1001-v6, 139 pages.

Bross et al., "Versatile Video Coding (Draft 5), " Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v7, 383 pages.

Bross et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v8, 397 pages.

Chen et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1002-v1, 70 pages.

Chen et al., "Screen Content Coding Using Non-Square Intra Block Copy for HEVC," IEEE International Conference on Multimedia and Expo (ICME), 2014, 6 pages.

Egilmez et al., "Non-CE6: Simplification of Implicit MTS," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0419-v1, 4 pages.

International Search Report and Written Opinion in PCT/US2020/035529, mailed Jul. 27, 2020, 7 pages.

Joshi et al., "High Efficiency Video Coding (HEVC) Screen Content Coding: Draft 4," Joint Collaborative Team on Video Coding (JCT-VC) of ITU-T SG 16 WP 3 and ISO/IEC JTC 1/SC 29/WG 11, 21st Meeting: Warsaw, PL, Jun. 19-26, 2015, Document: JCTVC-U1005_r1, 661 pages.

Joshi et al., "Screen content coding test model 1 (SCM 1), "Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, Document: JCTVC-Q1014, 5 pages.

Koo et al., "CE6: Reduced Secondary Transform (RST) (CE6-3.1)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0193, 19 pages.

Leannec et al., "Non-CE6: interaction between MTS and LFNST," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0466, 8 pages.

Liu et al., "Deep Learning-Based Technology in Responses to the Joint Call for Proposals on Video Compression with Capability Beyond HEVC," IEEE Transactions on Circuits and Systems for Video Technology, 2019, vol. 30, No. 5, 14 pages.

Liu et al., "Non-linear Motion-compensated Interpolation for Low Bit Rate Video," Applications of Digital Image Processing XXIII, 2000, vol. 4115, 12 pages.

Liu et al., "Bit-depth Scalable Coding for High Dynamic Range Video," Visual Communications and Image Processing, Apr. 2008, vol. 6822, 12 pages.

Liu et al., "Hybrid global-local motion compensated frame interpolation for low bit rate video coding," Journal of Visual Communication and Image, 2003, vol. 14, No. 1, pp. 61-79.

Liu et al., "Joint Temporal-Spatial Bit Allocation for Video Coding With Dependency," IEEE Transactions on Circuits and Systems for Video Technology, Jan. 2005, vol. 15, No. 1, pp. 15-26.

Liu et al., "Overview of HEVC extensions on screen content coding," APSIPA Transactions on Signal and Information Processing, 2015, vol. 4, No. e10, pp. 1-12.

Office Action in IN202147047980, mailed Mar. 30, 2022, 8 pages.

Office Action in JP2021538738, mailed Oct. 4, 2022, 11 pages.

Search Report and Office Action in RU202113012507, mailed Mar. 10, 2022, 14 pages.

Supplementary European Search Report in EP20818276.6, mailed Apr. 12, 2023, 12 pages.

Wang et al., "Intra block copy in AVS3 video coding standard," IEEE International Conference on Multimedia & Expo Workshops (ICMEW), 2020, 6 pages.

Xu et al., "Block vector prediction in intra block copy for HEVC screen content coding," Data Compression Conference, 2015, pp. 273-282.

Xu et al., "Intra block copy in HEVC screen content coding extensions," IEEE Journal on Emerging and Selected Topics in Circuits and Systems, 2016, vol. 6, No. 4, 11 pages.

(56) References Cited

OTHER PUBLICATIONS

Xu et al., "Intra block copy in versatile video coding with reference sample memory reuse," Picture Coding Symposium (PCS), 2019, 5 pages.
Zhang et al., "Intra mode coding in HEVC standard," Visual Communications and Image Processing, 2012, 6 pages.
Zhao et al., "Non-CE6: Harmonization of LFNST MIP and implicit MTS," Joint Video Experts Team (JVET) of ITU-T SG 16 WP 3 and ISO/IEC JTC 1/SC 29/WG 11, 15th Meeting: Gothenburg, SE, Jul. 3-12, Document: JVET-O0540, 4 pages.
Zhu et al., "Residual convolutional neural network based in-loop filter with intra and inter frames processed respectively for AVS3," IEEE International Conference on Multimedia & Expo Workshops (ICMEW), 2020, 6 pages.
Office Action received for Chinese Patent Application No. 202080020211.5, mailed on Jul. 19, 2023, 13 pages (Official copy only).

* cited by examiner 100
110
140
130
120
NETWORK 150

IMPLICIT TRANSFORM SELECTION

INCORPORATION BY REFERENCE

This application is a continuation of U.S. application Ser. No. 17/449,879, "METHOD AND APPARATUS FOR IMPROVED IMPLICIT TRANSFORM SELECTION" filed on Oct. 4, 2021, which is a continuation of U.S. application Ser. No. 16/883,545, "METHOD AND APPARATUS FOR IMPROVED IMPLICIT TRANSFORM SELECTION" filed on May 26, 2020, now U.S. Pat. No. 11,212,545, which claims the benefit of priority to U.S. Provisional Application No. 62/858,887, "IMPROVED IMPLICIT TRANSFORM SELECTION" filed on Jun. 7, 2019. The entire disclosures of the above-identified applications are incorporated herein by reference in their entirety.

TECHNICAL FIELD

The present disclosure presents a set of advanced video coding technologies. More specifically, a modified implicit transform approach is proposed.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 gigabytes (GB) of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide methods and apparatuses for video encoding/decoding. In some examples, an apparatus for video decoding includes receiving circuitry and processing circuitry.

According to an aspect of the disclosure, a method of video decoding for a decoder is provided. In the method, transform block signaling information is acquired from a coded video bitstream. In addition, a determination is made to determine whether the transform block signaling information indicates an implicit transform scheme, and at least one of a low-frequency non-separable transform (LFNST)

and a matrix-based intra predication mode (MIP) is invalid. In response to the determination that the transform block signaling information indicates the implicit transform scheme, and at least one of the LFNST and MIP is signaled as invalid, a primary transform type is determined based on a size of a coding block unit (CU), and a primary transform is performed for a transform block that is partitioned from the CU in accordance with the determined primary transform type.

In some embodiments, in order to determine the primary transform type, a determination can be made to determine whether a transform skip mode is enabled. In response to the determination that the transform skip mode is not enabled, a transform type DST-7 can be determined for a horizontal transform for the transform block, responsive to a width of the CU being equal to or greater than T1 and equal to or less than T2. A transform type DCT-2 can be determined for the horizontal transform for the transform block, responsive to the width of the CU being less than T1 or greater than T2. A transform type DST-7 can be determined for a vertical transform for the transform block responsive to a height of the CU being equal to or greater than T1 and equal to or less than T2. A transform type DCT-2 can be determined for the vertical transform for the transform block responsive to the height of the CU being less than T1 or greater than T2.

In some embodiments, the T1 can be equal to 2 pixels, 4 pixels, or 8 pixels, and T2 is equal to one of 4 pixels, 8 pixels, 16 pixels, or 32 pixels.

In response to the determination that that the transform block signaling information indicates the implicit transform scheme, and the at least one of the LFNST or MIP is signaled as true, in a first example, a first transform type DCT-2 can be determined for the transform block. In a second example, a second transform type that is not DCT-7 can be determined for the transform block, where the second transform type includes at least one of DST-1, DCT-5, compound orthonormal transform (COT), or karhunen-loève transform.

in response to the determination that that the transform block signaling information indicates the implicit transform scheme, and the MIP is signaled as false which indicates the MIP is not applied for the transform block, a transform type DST-7 can be determined for a horizontal transform for the transform block responsive to a width of the CU being equal to or greater than T1 and equal to or less than T2. A transform type DCT-2 can be determined for the horizontal transform for the transform block responsive to the width of the CU being less than T1 or greater than T2. A transform type DST-7 can be determined for a vertical transform for the transform block responsive to a height of the CU being equal to or greater than T1 and equal to or less than T2. A transform type DCT-2 can be determined for the vertical transform for the transform block responsive to the height of the CU being less than T1 or greater than T2.

In a first example, T1 can be equal to 2 pixels, and T2 can be equal to one of 4 pixels or 8 pixels. In a second example, T1 can be equal to 4 pixels, and T2 can be equal to one of 4 pixels or 8 pixels. In a third example, T1 can be equal to 8 pixels, and T2 can be equal to one of 8 pixels, 16 pixels, or 32 pixels. In a fourth example, T1 can be equal to 16 pixels, and T2 can be equal to one of 16 pixels or 32 pixels.

In some embodiments, in response to the determination that that the transform block signaling information indicates the implicit transform scheme, and both the LFNST and the MIP are signaled as false which indicates neither the LFNST or the MIP is applied for the transform block, a transform type DST-7 can be determined for a horizontal transform for the transform block responsive to a width of the CU being equal to or greater than T1 and equal to or less than T2. A transform type DCT-2 can be determined for the horizontal transform for the transform block responsive to the width of the CU being less than T1 or greater than T2. A transform type DST-7 can be determined for a vertical transform for the transform block responsive to a height of the CU being equal to or greater than T1 and equal to or less than T2. A transform type DCT-2 can be determined for the vertical transform of the transform block responsive to the height of the CU being less than T1 or greater than T2.

According to another aspect of the disclosure, a method of video decoding for a decoder is provided. In the method, a transform block signaling information is acquired from the coded video bitstream. A primary transform type is determined based on the transformation block signaling information and a size of the coding block unit (CU). A primary transform is performed for the transform block that is partitioned from the CU in accordance with the determined primary transform type.

In some embodiments, in order to determine the primary transform type, a transform type DST-7 can be determined for a horizontal transform for the transform block responsive to a width of the CU being equal to or greater than T1 and equal to or less than T2. A transform type based on a signaled index from the transformation block signaling information can be determined for the horizontal transform of the transform block, responsive to the width of the CU being greater than T2 and equal to or less than T3. The signaled index indicates that the transform type is one of DCT-2 or DST-7. A transform type DCT-2 can be determined for the horizontal transform for the transform block responsive to the width of the CU being less than T1 or greater than T3.

In some embodiments, in order to determine the primary transform type, a transform type DST-7 can be determined for a vertical transform for the transform block responsive to a height of the CU being equal to or greater than T1 and equal to or less than T2. A transform type based on a signaled index from the transformation block signaling information can be determined for the vertical transform for the transform block, responsive to the height of the CU being greater than T2 and equal to or less than T3. The signaled index indicates that the transform type is one of DCT-2 or DST-7. A transform type DCT-2 can be determined for the vertical transform for the transform block responsive to the height of the CU being less than T1 or greater than T3.

In some embodiments, the T1 can be equal to one of 2 pixels, 4 pixels, or 8 pixels. The T2 can be equal to one of 4 pixels, 8 pixels, 16 pixels, or 32 pixels, and the T3 can be equal to one of 8 pixels, 16 pixels, 32 pixels, or 64 pixels.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
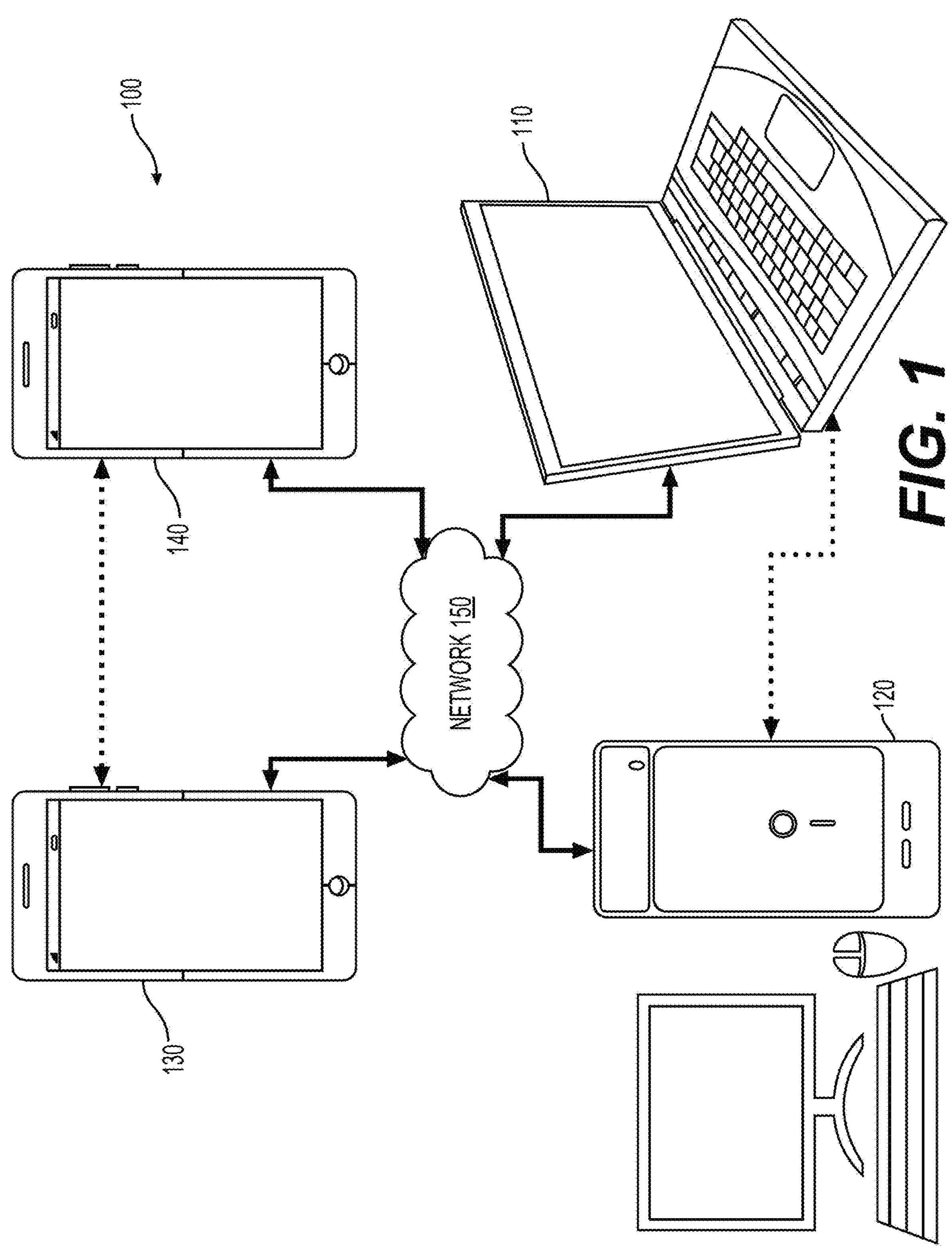
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
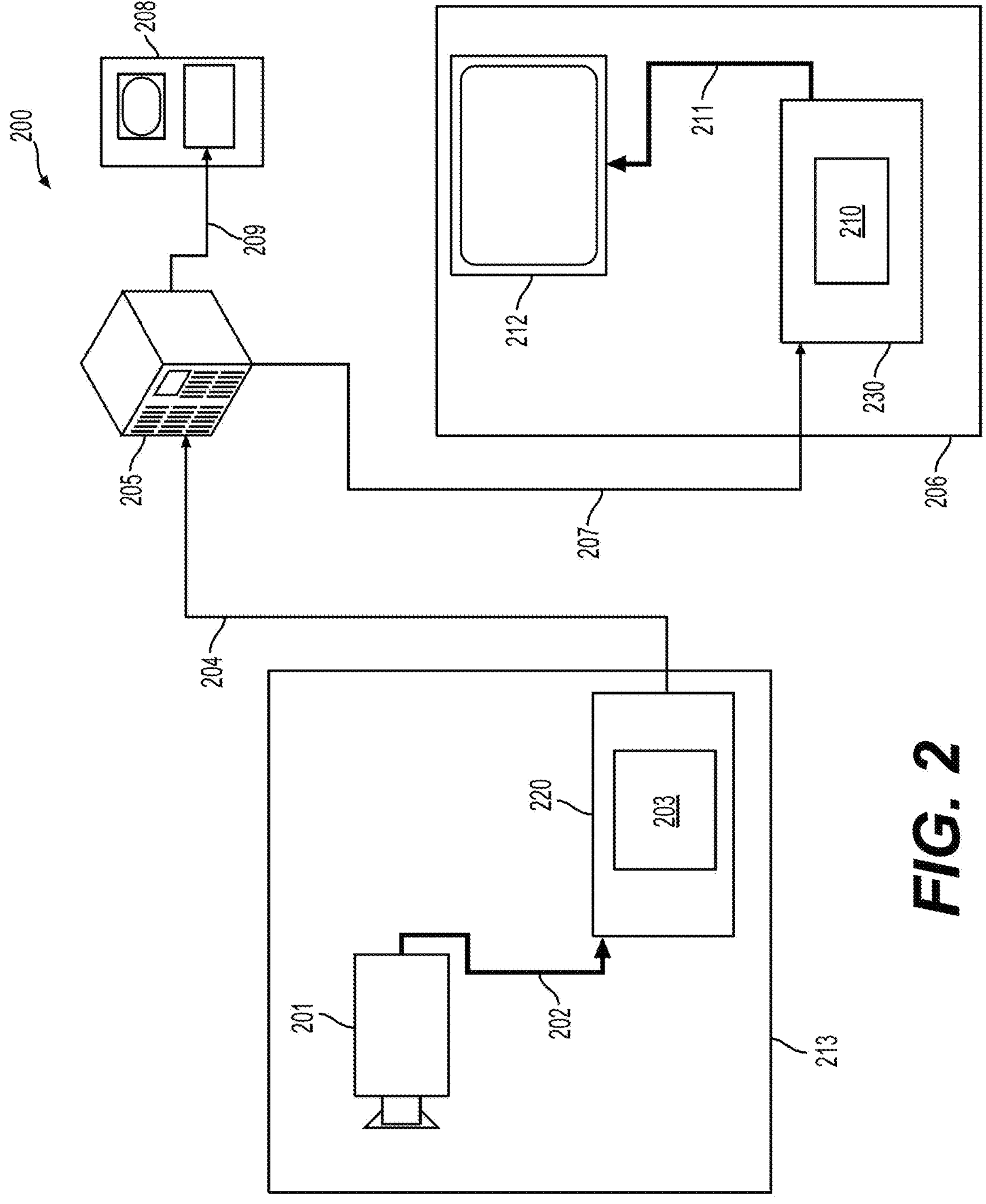
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
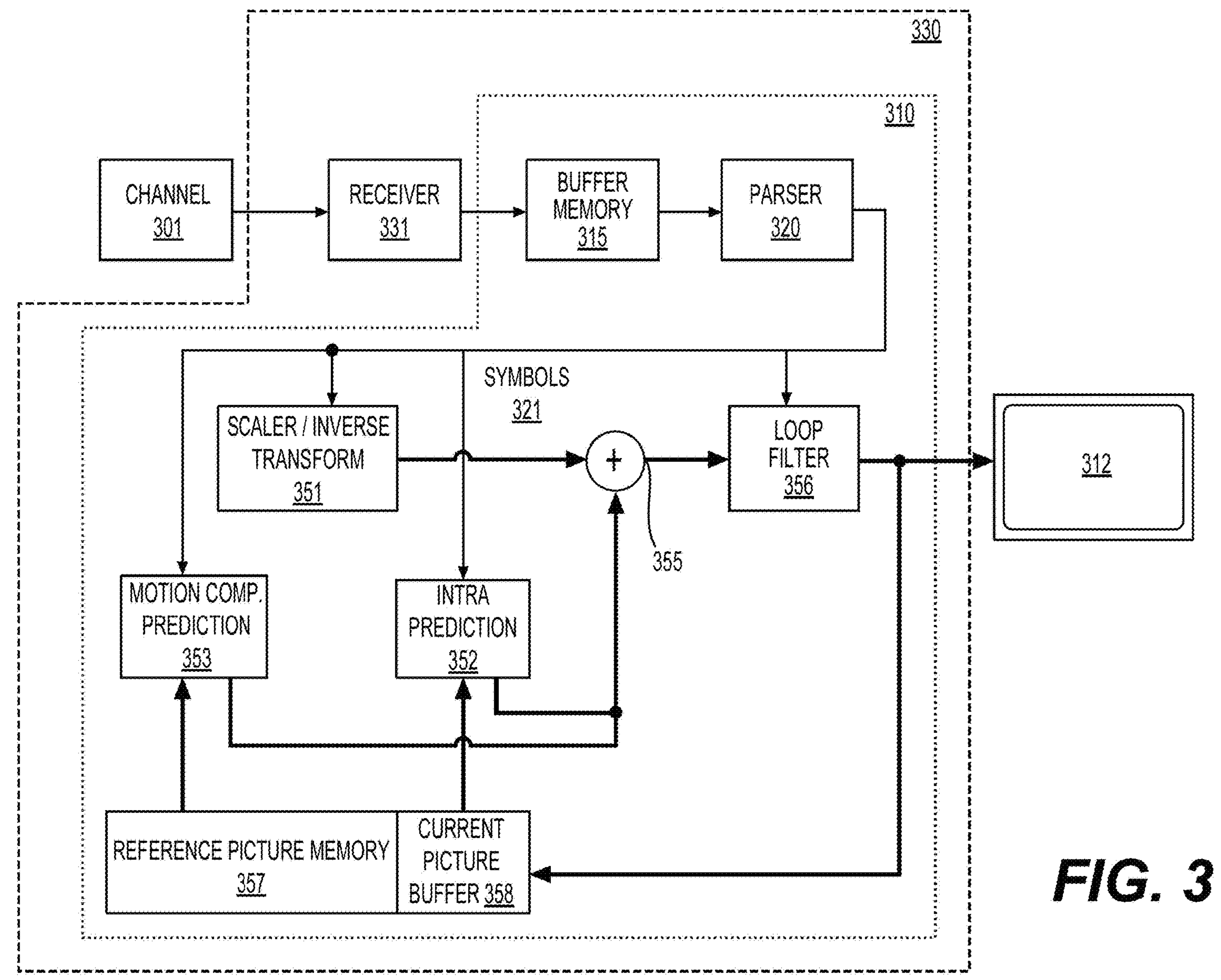
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
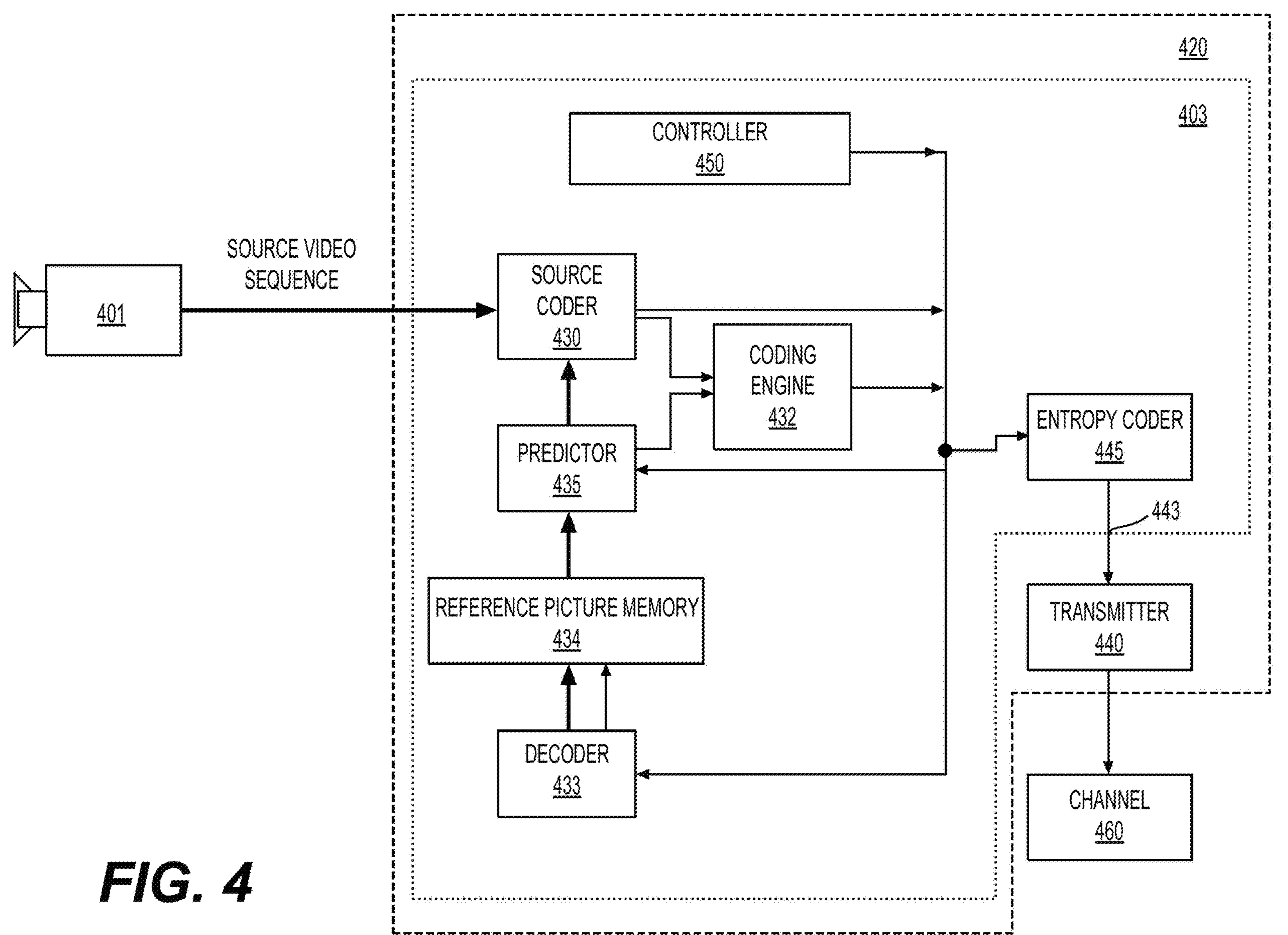
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT. 601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PB s. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
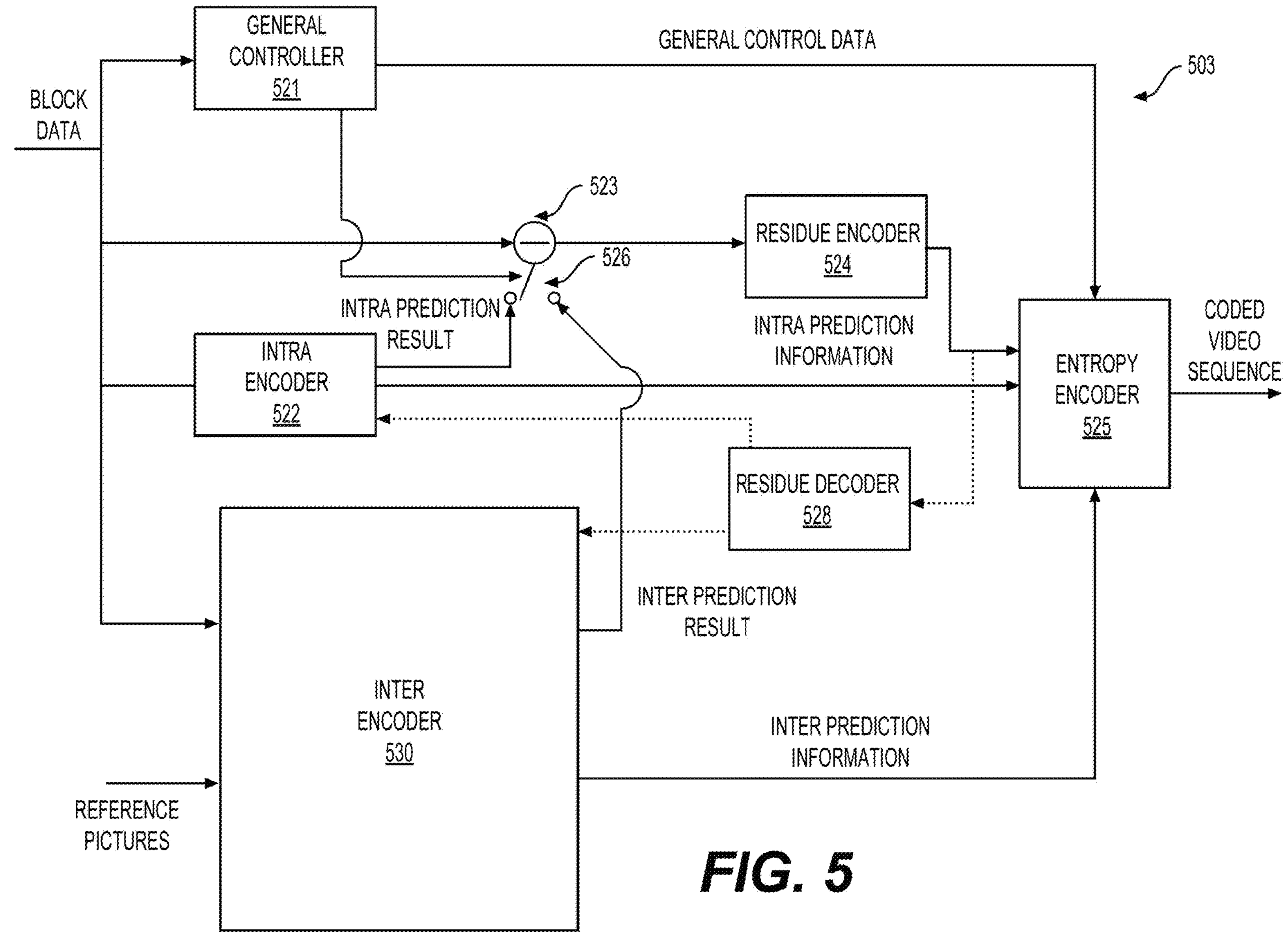
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
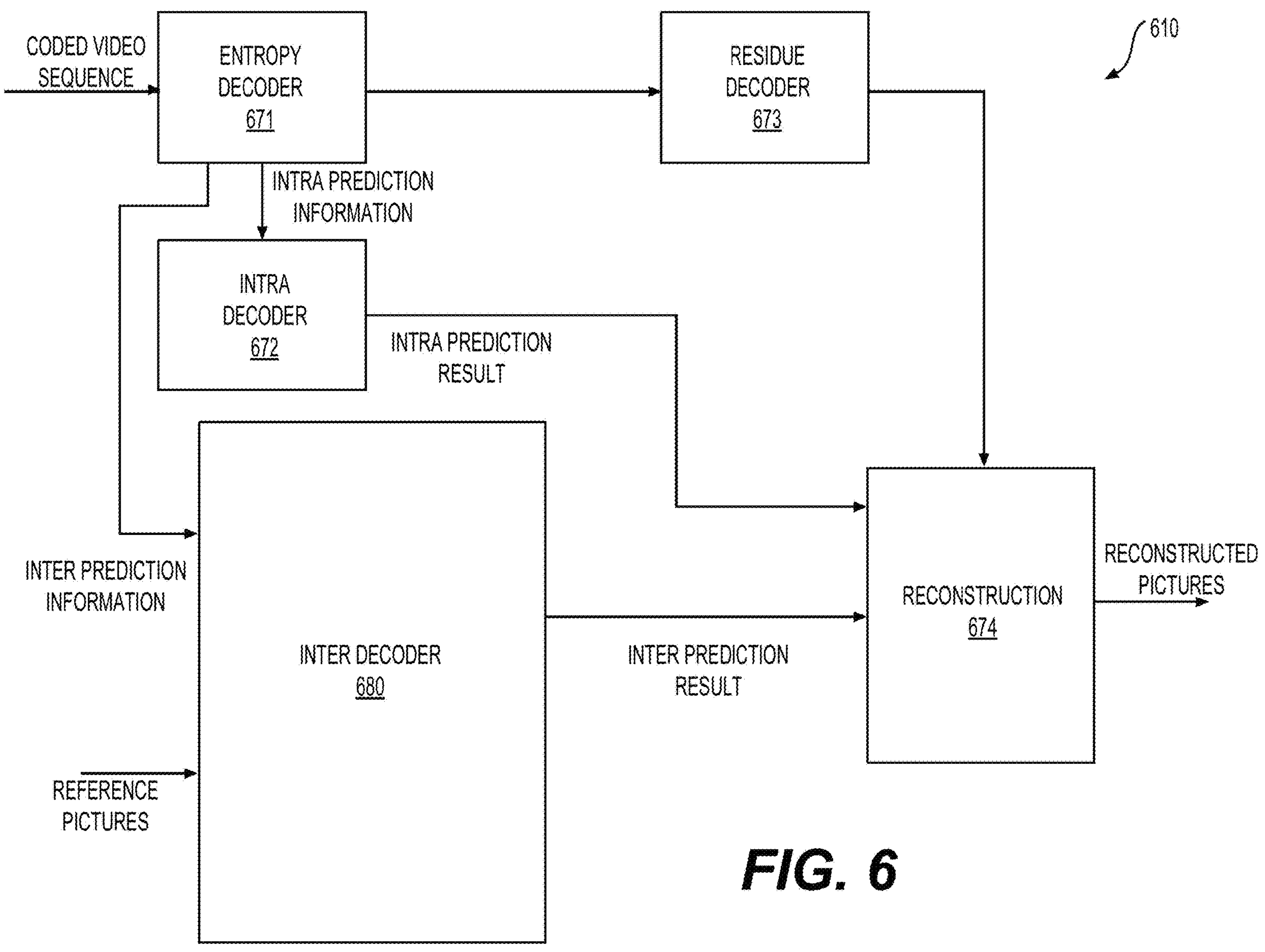
FIG. 6 shows a block diagram of a decoder in accordance with another embodiment.
Figures 7A, 7B, 7C, 7D:
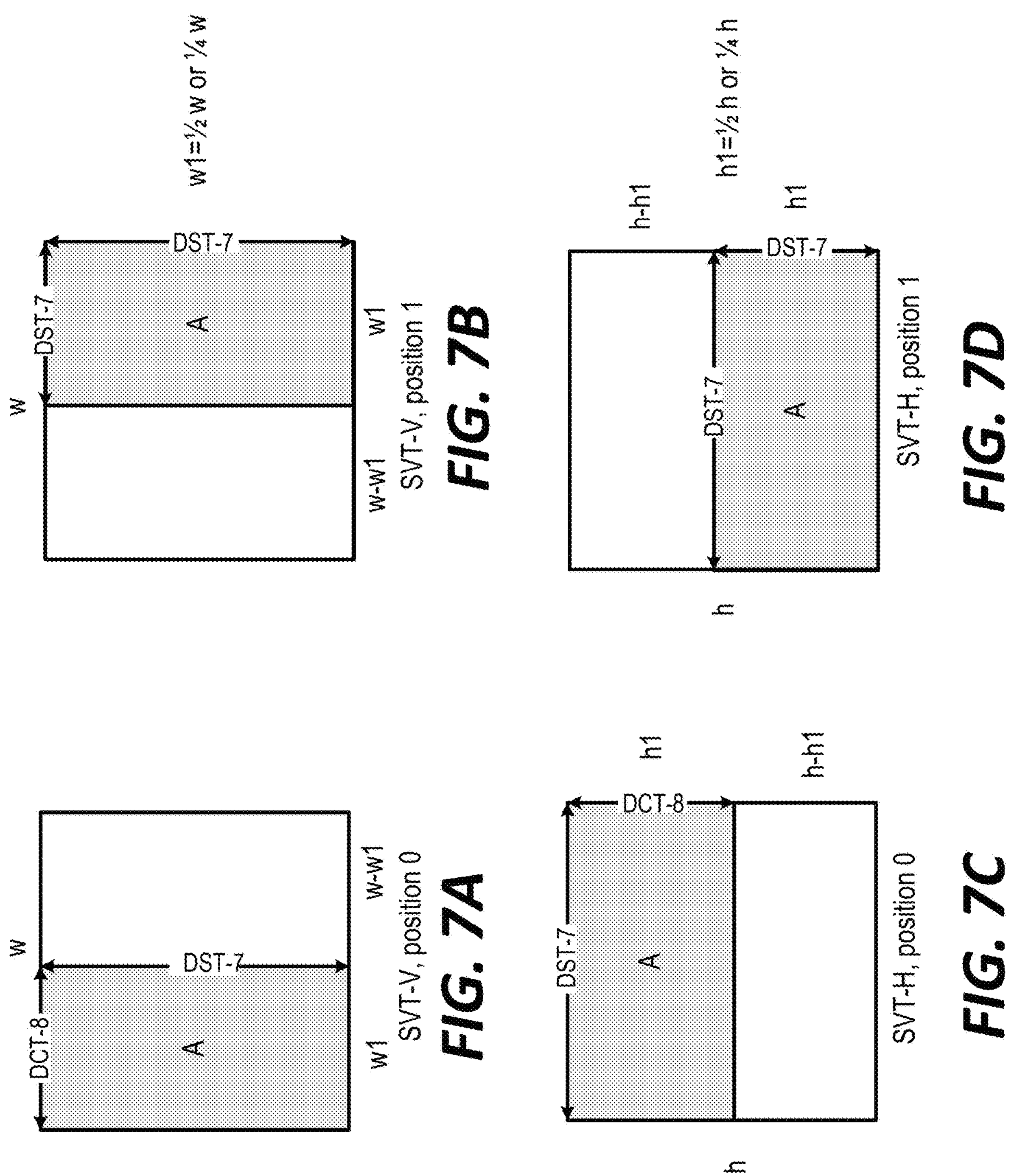
FIGS. 7A-7D show four exemplary sub-block transform modes.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide a set of advanced video coding technologies. More specifically, a modified implicit transform approach is proposed.

In video coding society, ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3) and 2016 (version 4). Since then, the ITU-T and ISO/IEC have been studying the potential need for standardization of future video coding technology with a compression capability that significantly exceeds that of the HEVC standard (including its extensions). In October 2017, the ITU-T and ISO/IEC issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team—Joint Video Expert Team) meeting. JVET formally launched the standardization of next-generation video coding beyond HEVC (i.e., Versatile Video Coding (VVC)), and the current version of VTM (VVC Test Model) (i.e., VTM3).

In HEVC, the primary transforms may be 4-point, 8-point, 16-point and 32-point DCT-2, and the transform core matrices may be represented using 8-bit integers, i.e., 8-bit transform core. The transform core matrices of smaller DCT-2 are part of larger DCT-2, as shown below.

| 4 × 4 transform |
| --- |
| {64, 64, 64, 64}<br>{83, 36, −36, −83}<br>{64, −64, −64, 64}<br>{36, −83, 83, −36} |
| **8 × 8 transform** |
| {64, 64, 64, 64, 64, 64, 64, 64}<br>{89, 75, 50, 18, −18, −50, −75, −89}<br>{83, 36, −36, −83, −83, −36, 36, 83}<br>{75, −18, −89, −50, 50, 89, 18, −75}<br>{64, −64, −64, 64, 64, −64, −64, 64}<br>{50, −89, 18, 75, −75, −18, 89, −50} |

-continued

| |
|---|
| {36, −83, 83, −36, −36, 83, −83, 36} |
| {18, −50, 75, −89, 89, −75, 50, −18} |
| 16 × 16 transform |
| {64 64 64 64 64 64 64 64 64 64 64 64 64 64 64 64} |
| {90 87 80 70 57 43 25 9 −9 −25 −43 −57 −70 −80 −87 −90} |
| {89 75 50 18 −18 −50 −75 −89 −89 −75 −50 −18 18 50 75 89} |
| {87 57 9 −43 −80 −90 −70 −25 25 70 90 80 43 −9 −57 −87} |
| {83 36 −36 −83 −83 −36 36 83 83 36 −36 −83 −83 −36 36 83} |
| {80 9 −70 −87 −25 57 90 43 −43 −90 −57 25 87 70 −9 −80} |
| {75 −18 −89 −50 50 89 18 −75 −75 18 89 50 −50 −89 −18 75} |
| {70 −43 −87 9 90 25 −80 −57 57 80 −25 −90 −9 87 43 −70} |
| {64 −64 −64 64 64 −64 −64 64 64 −64 −64 64 −64 −64 −64 64} |
| {57 −80 −25 90 −9 87 43 70 −70 −43 87 9 −90 25 80 −57} |
| {50 −89 18 75 −75 −18 89 −50 −50 89 −18 −75 75 18 −89 50} |
| {43 −90 57 25 −87 70 9 −80 80 −9 −70 87 −25 −57 90 −43} |
| {36 −83 83 −36 −36 83 −83 36 36 −83 83 −36 −36 83 −83 36} |
| {25 −70 90 −80 43 9 −57 87 −87 57 −9 −43 80 −90 70 −25} |
| {18 −50 74 −89 89 −75 50 −18 −18 50 −75 89 −89 75 −50 18} |
| {9 −25 43 −57 70 −80 87 −90 90 −87 80 −70 57 −43 25 −9} |
| 32 × 32 transform |
| {64 64 64 64 64 64 64 64 64 64 64 64 64 64 64 64 64 64 64 64 64 64 64 64 64 64 64 64 64 64 64 64} |
| {90 90 88 85 82 78 73 67 61 54 46 38 31 22 13 4 −4 −13 −22 −31 −38 −46 −54 −61 −67 −73 −78 −82 −85 −88 −90 −90} |
| {90 87 80 70 57 43 25 9 −9 −25 −43 −57 −70 −80 −87 −90 −90 −87 −80 −70 −57 −43 −25 −9 9 25 43 57 70 80 87 90} |
| {90 82 67 46 22 −4 −31 −54 −73 −85 −90 −88 −78 −61 −38 −13 13 38 61 78 88 90 85 73 54 31 4 −22 −46 −67 −82 −90) |
| {89 75 50 18 −18 −50 −75 −89 −89 −75 −50 −18 18 50 75 89 89 75 50 18 −18 −50 −75 −89 −89 −75 −50 −18 18 50 75 89} |
| {88 67 31 −13 −54 −82 −90 −78 −46 −4 38 73 90 85 61 22 −22 −61 −85 −90 −73 −38 4 46 78 90 82 54 13 −31 −67 −88} |
| {87 57 9 −43 −80 −90 −70 −25 25 70 90 80 43 −9 −57 −87 −87 −57 −9 43 80 90 70 25 −25 −70 −90 −80 −43 9 57 87} |
| {85 46 −13 −67 −90 −73 −22 38 82 88 54 −4 −61 −90 −78 −31 31 78 90 61 4 −54 −88 −82 −38 22 73 90 67 13 −46 −85} |
| {83 36 −36 −83 −83 −36 36 83 83 36 −36 −83 −83 −36 36 83 83 36 −36 −83 −83 −36 36 83 83 36 −36 −83 −83 −36 36 83} |
| {82 22 −54 −90 −61 13 78 85 31 −46 −90 −67 4 73 88 38 −38 −88 −73 −4 67 90 46 −31 −85 −78 −13 61 90 54 −22 −82} |
| {80 9 −70 −87 −25 57 90 43 −43 −90 −57 25 87 70 −9 −80 −80 −9 70 87 25 −57 −90 −43 43 90 57 −25 −87 −70 9 80} |
| {78 −4 −82 −73 13 85 67 −22 −88 −61 31 90 54 −38 −90 −46 46 90 38 −54 −90 −31 61 88 22 −67 −85 −13 73 82 4 −78} |
| {75 −18 −89 −50 50 89 18 −75 −75 18 89 50 −50 −89 −18 75 75 −18 −89 −50 50 89 18 −75 −75 18 89 50 −50 −89 −18 75} |

-continued

| |
|---|
| {73 −31 −90 −22 78 67 −38 −90 −13 82 61 −46 −88 −4 85 54 −54 −85 4 88 46 −61 −82 13 90 38 −67 −78 22 90 31 −73} |
| {70 −43 −87 9 90 25 −80 −57 57 80 −25 −90 −9 87 43 −70 −70 43 87 −9 −90 −25 80 57 −57 −80 25 90 9 −87 −43 70} |
| {67 −54 −78 38 85 −22 −90 4 90 13 −88 −31 82 46 −73 −61 61 73 −46 −82 31 88 −13 −90 −4 90 22 −85 −38 78 54 −67} |
| {64 −64 −64 64 64 −64 −64 64 64 −64 −64 64 64 −64 −64 64 64 −64 −64 64 64 −64 −64 64 64 −64 −64 64 64 −64 −64 64} |
| {61 −73 −46 82 31 −88 −13 90 −4 −90 22 85 −38 −78 54 67 −67 −54 78 38 −85 −22 90 4 −90 13 88 −31 −82 46 73 −61} |
| {57 −80 −25 90 −9 −87 43 70 −70 −43 87 9 −90 25 80 −57 −57 80 25 −90 9 87 −43 −70 70 43 −87 −9 90 −25 −80 57} |
| {54 −85 −4 88 −46 −61 82 13 −90 38 67 −78 −22 90 −31 −73 73 31 −90 22 78 −67 −38 90 −13 −82 61 46 −88 4 85 −54} |
| {50 −89 18 75 −75 −18 89 −50 −50 89 −18 −75 75 18 −89 50 50 −89 18 75 −75 −18 89 −50 −50 −89 −18 −75 745 18 −89 50} |
| {46 −90 38 54 −90 31 61 −88 22 67 −85 13 73 −82 4 78 −78 −4 82 −73 −13 85 −67 −22 88 −61 −31 90 −54 −38 90 −46} |
| {43 −90 57 25 −87 70 9 −80 80 −9 −70 87 −25 −57 90 −43 −43 90 −57 −25 87 −90 −9 80 −80 9 70 −87 25 57 −90 43} |
| {38 −88 73 −4 −67 90 −46 −31 85 −78 13 61 −90 54 22 −82 82 −22 −54 90 −61 −13 78 −85 31 46 −90 67 4 −73 88 −38} |
| {36 −83 83 −36 −36 83 83 36 36 −83 83 −36 −36 83 −83 36 36 −83 83 −36 −36 83 −83 36 36 −83 83 −36 −36 83 −83 36} |
| {31 −78 90 −61 4 54 −88 82 −38 −22 73 −90 67 −13 −46 85 −88 46 13 −67 90 −73 22 38 −82 88 −54 −4 61 −90 78 −31} |
| {25 −70 90 −80 43 9 −57 87 −87 57 −9 −43 80 −90 70 −25 −25 70 −90 80 −43 −9 57 −87 87 −57 9 43 −80 90 −70 25} |
| {22 −61 85 −90 73 −38 −4 46 −78 90 −82 54 −13 −31 67 −88 88 −67 31 13 −54 82 −90 78 −46 4 38 −73 90 −85 61 −22} |
| {18 −50 75 −89 89 −75 80 −18 −18 50 −75 89 −89 75 −50 18 18 −50 75 −89 89 −75 50 −18 −18 50 −75 89 −89 75 15 18} |
| {13 −38 61 −78 88 −90 85 −73 54 −31 40 22 −46 67 −82 90 −90 82 −67 46 −22 −4 31 −54 73 −85 90 −88 78 −61 38 −13} |
| {9 −25 43 −57 70 −80 87 −90 90 −87 80 −70 57 −43 25 −9 −9 25 −43 57 −70 80 −87 90 −90 87 −80 70 −57 43 −25 9} |
| {4 −13 22 −31 38 −46 54 −61 67 −73 78 −82 85 −88 90 −90 90 −90 88 −85 82 −78 73 −67 61 −54 46 −38 31 −22 13 −4} |

The DCT-2 cores show symmetry/anti-symmetry characteristics. Thus, a so-called "partial butterfly" implementation is supported to reduce the number of operation counts (multiplications, adds/subs, shifts), and identical results of matrix multiplication can be obtained using partial butterfly.

In VVC, two sub-block transforms are provided. A first sub-block transform is SVT or SBT. In JVET-J0024, JVET-K0139 and JVET-L0358, a spatially varying transform (SVT) scheme is proposed. With SVT, for inter prediction residuals, there may be only residual block in the coding block. Since the residual block is smaller than the coding block, the transform size in SVT is smaller than the coding block size. For the region which is not covered by the residual block or transform, zero residual may be assumed.

More specifically, in JVET-L0358, SVT may also be called Sub-block Transform (SBT). The sub-block types (SVT-H, SVT-V), sizes and positions (Left half, left quarter, right half, right quarter, top half, top quarter, bottom half, bottom quarter) supported in SBT can be shown in FIGS. 7A-7D. FIGS. 7A-7D illustrate the sub-block types (SVT-H, SVT-V), and the positions (Left half, right half, top half, bottom half) supported in SBT respectively. The shaded region labeled by a letter "A" is a residual block with transform, and the other region is assumed to be a zero residual without transform.

Figure 8:
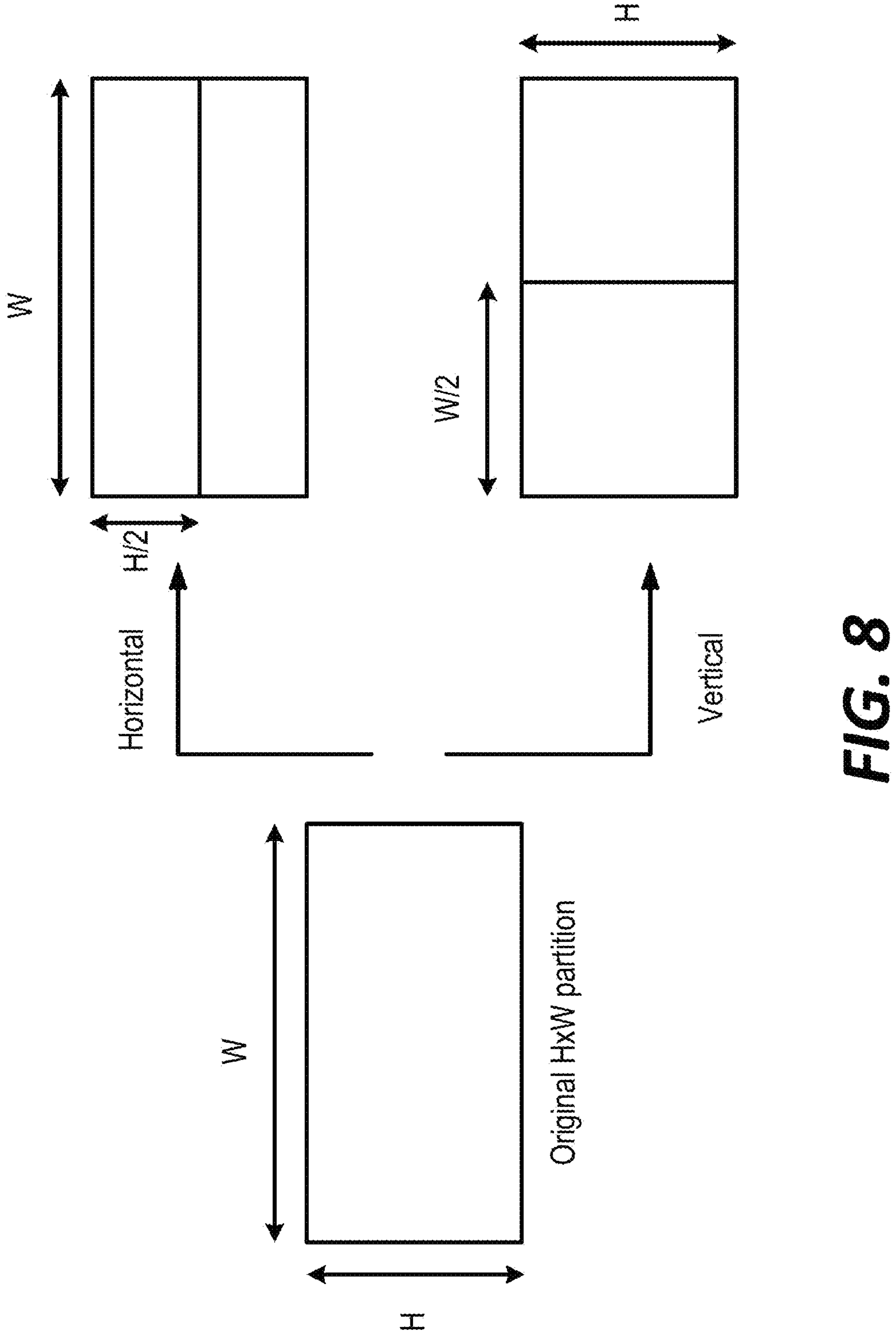
FIG. 8 shows a first exemplary division of a luma intra-predicted block based on Intra Sub-Partitions (ISP) coding mode.
Figure 9:
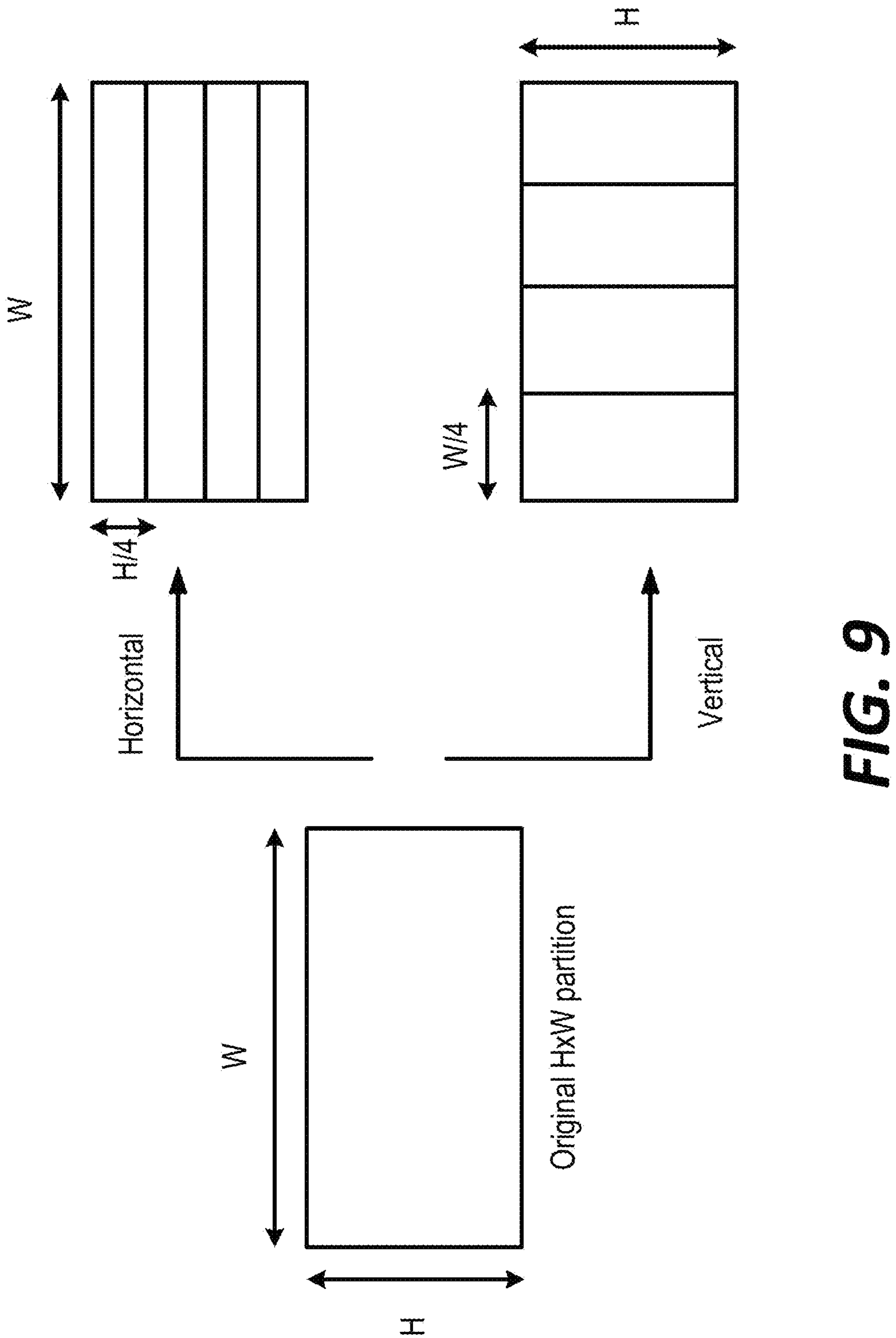
FIG. 9 shows a second exemplary division of luma intra-predicted block based on Intra Sub-Partitions (ISP) coding mode.

A second sub-block transform is an Intra Sub-Partitions (ISP). The ISP coding mode divides luma intra-predicted blocks vertically or horizontally into 2 or 4 sub-partitions depending on the block size dimensions, as shown in Table 1. FIG. 8 and FIG. 9 show examples of the two possibilities. FIG. 8 illustrates an exemplary division of a 4×8 block or a 8×4 block. FIG. 9 illustrates an exemplary division of a block that is not one of a 4×8 block, a 8×4 bock, or a 4×4 block. All sub-partitions fulfill the condition of having at least 16 samples. For chroma components, ISP is not applied.

TABLE 1

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

In some embodiments, for each of these sub-partitions, a residual signal can be generated by entropy decoding the coefficients sent by the encoder and then inverse quantizing and inverse transforming the coefficients. Then, the sub-partition is intra predicted, and finally, the corresponding reconstructed samples are obtained by adding the residual signal to the prediction signal. Therefore, the reconstructed values of each sub-partition can be available to generate the prediction of the next one, which can repeat the process and so on. All sub-partitions share the same intra mode.

In some embodiments, the ISP algorithm will only be tested with intra modes that are part of the MPM list. For this reason, if a block uses ISP, then the MPM flag can be inferred to be one. Besides, if ISP is used for a certain block, then the MPM list can be modified to exclude the DC mode and to prioritize horizontal intra modes for the ISP horizontal split and vertical intra modes for the vertical one.

In ISP, each sub-partition can be regarded as a sub-TU, since the transform and reconstruction is performed individually for each sub-partition.

In current VVC, besides 4-point, 8-point, 16-point and 32-point DCT-2 transforms which are same with HEVC, additional 2-point and 64-point DCT-2 are also included for a primary transform. The 64-point DCT-2 core defined in VVC can be shown below as a 64×64 matrix:

```
{
{ aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa, aa }
{ bf, bg, bh, bi, bj, bk, bl, bm, bn, bo, bp, bq, br, bs, bt, bu, bv, bw, bx, by, bz, ca,
cb, cc, cd, ce, cf, cg, ch, ci, cj, ck, −ck, −cj, −ci, −ch, −cg, −cf, −ce, −cd, −cc, −cb, −ca, −bz, −by,
−bx, −bw, −bv, −bu, −bt, −bs, −br, −bq, −bp, −bo, −bn, −bm, −bl, −bk, −bj, −bi,
−bh, −bg, −bf }
{ ap, aq, ar, as, at, au, av, aw, ax, ay, az, ba, bb, bc, bd, be, −be, −bd, −bc, −bb, −ba, −az,
−ay, −ax, −aw, −av, −au, −at, −as, −ar,
−aq, −ap, −ap, −aq, −ar, −as, −at, −au, −av, −aw, −ax, −ay, −az, −ba, −bb, −bc, −bd, −be, be, bd, bc, bb,
ba, az, ay, ax, aw, av, au, at, as, ar, aq, ap }
{ bg, bj, bm, bp, bs, bv, by, cb, ce, ch, ck, −ci, −cf, −cc, −bz, −bw, −bt, −bq, −bn, −bk, −bh, −bf,
−bi, −bl, −bo, −br, −bu, −bx, −ca, −cd,
−cg, −cj, cj, cg, cd, ca, bx, bu, br, bo, bl, bi, bf, bh, bk, bn, bq, bt, bw, bz, cc, cf, ci,
−ck, −ch, −ce, −cb, −by, −bv, −bs, −bp, −bm, −bj, −bg }
{ ah, ai, aj, ak, al, am, an, ao, −ao, −an, −am, −al, −ak, −aj, −ai, −ah, −ah, −ai, −aj, −ak, −al, −am,
−an, −ao, ao, an, am, al, ak, aj, ai, ah, ah, ai, aj, ak, al, am, an, ao, −ao, −an, −am, −al, −ak,
−aj, −ai, −ah, −ah, −ai, −aj, −ak, −al, −am, −an, −ao, ao, an, am, al, ak, aj, ai, ah }
{ bh, bm, br, bw, cb, cg, −ck, −cf, −ca, −bv, −bq, −bl, −bg, −bi, −bn, −bs, −bx, −cc, −ch, cj, ce, bz,
bu, bp, bk, bf, bj, bo, bt, by, cd, ci, −ci, −cd, −by, −bt, −bo, −bj, −bf, −bk, −bp, −bu, −bz, −ce, −cj,
ch, cc, bx, bs, bn, bi, bg, bl, bq, bv, ca, cf, ck, −cg, −cb, −bw,
−br, −bm, −bh }
{ aq, at, aw, az, bc, −be, −bb, −ay, −av, −as, −ap, −ar, −au, −ax, −ba, −bd, bd, ba, ax, au, ar, ap,
as, av, ay, bb, be, −bc, −az, −aw,
−at, −aq, −aq, −at, −aw, −az, −bc, be, bb, ay, av, as, ap, ar, au, ax, ba, bd, −bd, −ba, −ax, −au,
−ar, −ap, −as, −av, −ay, −bb, −be, bc, az, aw, at, aq }
{ bi, bp, bw, cd, ck, −ce, −bx, −bq, −bj, −bh, −bo, −bv, −cc, −cj, cf, by, br, bk, bg, bn, bu, cb,
ci, −cg, −bz, −bs, −bl, −bf, −bm, −bt, −ca, −ch, ch, ca, bt, bm, bf, bl, bs, bz, cg, −ci, −cb, −bu,
−bn, −bg, −bk, −br, −by, −cf, cj, cc, bv, bo, bh, bj, bq, bx, ce, −ck, −cd, −bw, −bp, −bi }
{ ad, ae, af, ag, −ag, −af, −ae, −ad, −ad, −ae, −af, −ag, ag, af, ae, ad, ad, ae, af, ag, −ag, −af,
−ae, −ad, −ad, −ae, −af, −ag, ag, af, ae, ad, ad, ae, af, ag, −ag, −af, −ae, −ad, −ad, −ae, −af, −ag, ag,
af, ae, ad, ad, ae, af, ag, −ag, −af, −ae, −ad, −ad, −ae, −af, −ag, ag, af, ae, ad }
{ bj, bs, cb, ck, −cc, −bt, −bk, −bi, −br, −ca, −cj, cd, bu, bl, bh, bq, bz, ci, −ce, −bv, −bm, −bg,
−bp, −by, −ch, cf, bw, bn, bf, bo, bx, cg, −cg, −bx, −bo, −bf, −bn, −bw, −cf, ch, by, bp, bg, bm,
bv, ce, −ci, −bz, −bq, −bh, −bl, −bu, −cd, cj, ca, br, bi, bk, bt, cc, −ck, −cb, −bs, −bj }
{ ar, aw, bb, −bd, −ay, −at, −ap, −au, −az, −be, ba, av, aq, as, ax, bc, −bc, −ax, −as, −aq, −av, −ba,
be, az, au, ap, at, ay, bd, −bb, −aw, −ar, −ar, −aw, −bb, bd, ay, at, ap, au, az, be, −ba, −av,
−aq, −as, −ax, −bc, bc, ax, as, aq, av, ba, −be, −az, −au, −ap, −at, −ay, −bd, bb, aw, ar }
{ bk, bv, cg, −ce, −bt, −bi, −bm, −bx, −ci, cc, br, bg, bo, bz, ck, −ca, −bp, −bf, −bq, −cb, cj, by,
bn, bh, bs, cd, −ch, −bw, −bl, −bj, −bu, −cf, cf, bu, bj, bl, bw, ch, −cd, −bs, −bh, −bn, −by, −cj,
cb, bq, bf, bp, ca, −ck, −bz, −bo, −bg, −br, −cc, ci, bx, bm, bi, bt, ce, −cg, −bv, −bk }
{ ai, al, ao, −am, −aj, −ah, −ak, −an, an, ak, ah, aj, am, −ao, −al, −ai, −ai, −al, −ao, am, aj, ah,
ak, an, −an, −ak, −ah, −aj, −am, ao, al, ai, ai, al, ao, −am, −aj, −ah, −ak, −an, an, ak, ah, aj, am,
−ao, −al, −ai, −ai, −al, −ao, am, aj, ah, ak, an, −an, −ak, −ah, −aj, −am, ao, al, ai }
```

-continued

{ bl, by, −ck, −bx, −bk, −bm, −bz, cj, bw, bj, bn, ca, −ci, −bv, −bi, −bo, −cb, ch, bu, bh, bp, cc, −cg, −bt, −bg, −bq, −cd, cf, bs, bf, br, ce, −ce, −br, −bf, −bs, −cf, cd, bq, bg, bt, cg, −cc, −bp, −bh, −bu, −ch, cb, bo, bi, bv, ci, −ca, −bn, −bj, −bw, −cj, bz, bm, bk, bx, ck, −by, −bl }
{ as, az, −bd, −aw, −ap, −av, −bc, ba, at, ar, ay, −be, −ax, −aq, −au, −bb, bb, au, aq, ax, be, −ay, −ar, −at, −ba, bc, av, ap, aw, bd, −az, −as, −as, −az, bd, aw, ap, av, bc, −ba, −at, −ar, −ay, be, ax, aq, au, bb, −bb, −au, −aq, −ax, −be, ay, ar, at, ba, −bc, −av, −ap, −aw, −bd, az, as }
{ bm, cb, −cf, −bq, −bi, −bx, cj, bu, bf, bt, ci, −by, −bj, −bp, −ce, cc, bn, bl, ca, −cg, −br, −bh, −bw, ck, bv, bg, bs, ch, −bz, −bk, −bo, −cd, cd, bo, bk, bz, −ch, −bs, −bg, −bv, −ck, bw, bh, br, cg, −ca, −bl, −bn, −cc, ce, bp, bj, by, −ci, −bt, −bf, −bu, −cj, bx, bi, bq, cf, −cb, −bm }
{ ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab }
{ bn, ce, −ca, −bj, −br, −ci, bw, bf, bv, −cj, −bs, −bi, −bz, cf, bo, bm, cd, −cb, −bk, −bq, −ch, bx, bg, bu, −ck, −bt, −bh, −by, cg, bp, bl, cc, −cc, −bl, −bp, −cg, by, bh, bt, ck, −bu, −bg, −bx, ch, bq, bk, cb, −cd, −bm, −bo, −cf, bz, bi, bs, cj, −bv, −bf, −bw, ci, br, bj, ca, −ce, −bn }
{ at, bc, −ay, −ap, −ax, bd, au, as, bb, −az, −aq, −aw, be, av, ar, ba, −ba, −ar, −av, −be, aw, aq, az, −bb, −as, −au, −bd, ax, ap, ay, −bc, −at, −at, −bc, ay, ap, ax, −bd, −au, −as, −bb, az, aq, aw, −be, −av, −ar, −ba, ba, ar, av, be, −aw, −aq, −az, bb, as, au, bd, −ax, −ap, −ay, bc, at }
{ bo, ch, −bv, −bh, −ca, cc, bj, bt, −cj, −bq, −bm, −cf, bx, bf, by, −ce, −bl, −br, −ck, bs, bk, cd, −bz, −bg, −bw, cg, bn, bp, ci, −bu, −bi, −cb, cb, bi, bu, −ci, −bp, −bn, −cg, bw, bg, bz, −cd, −bk, −bs, ck, br, bl, ce, −by, −bf, −bx, cf, bm, bq, cj, −bt, −bj, −cc, ca, bh, bv, −ch, −bo }
{ aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj, aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj }
{ bp, ck, −bq, −bo, −cj, br, bn, ci, −bs, −bm, −ch, bt, bl, cg, −bu, −bk, −cf, bv, bj, ce, −bw, −bi, −cd, bx, bh, cc, −by, −bg, −cb, bz, bf, ca, −ca, −bf, −bz, cb, bg, by, −cc, −bh, −bx, cd, bi, bw, −ce, −bj, −bv, cf, bk, bu, −cg, −bl, −bt, ch, bm, bs, −ci, −bn, −br, cj, bo, bq, −ck, −bp }
{ au, −be, −at, −av, bd, as, aw, −bc, −ar, −ax, bb, aq, ay, −ba, −ap, −az, az, ap, ba, −ay, −aq, −bb, ax, ar, bc, −aw, −as, −bd, av, at, be, −au, −au, be, at, av, −bd, −as, −aw, bc, ar, ax, −bb, −aq, −ay, ba, ap, az, −az, −ap, −ba, ay, aq, bb, −ax, −ar, −bc, aw, as, bd, −av, −at, −be, au }
{ bq, −ci, −bl, −bv, cd, bg, ca, −by, −bi, −cf, bt, bn, ck, −bo, −bs, cg, bj, bx, −cb, −bf, −cc, bw, bk, ch, −br, −bp, cj, bm, bu, −ce, −bh, −bz, bz, bh, ce, −bu, −bm, −cj, bp, br, −ch, −bk, −bw, cc, bf, cb, −bx, −bj, −cg, bs, bo, −ck, −bn, −bt, cf, bi, by, −ca, −bg, −cd, bv, bl, ci, −bq }
{ ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae }
{ br, −cf, −bg, −cc, bu, bo, −ci, −bj, −bz, bx, bl, ck, −bm, −bw, ca, bi, ch, −bp, −bt, cd, bf, ce, −bs, −bq, cg, bh, cb, −bv, −bn, cj, bk, by, −by, −bk, −cj, bn, bv, −cb, −bh, −cg, bq, bs, −ce, −bf, −cd, bt, bp, −ch, −bi, −ca, bw, bm, −ck, −bl, −bx, bz, bj, ci, −bo, −bu, cc, bg, cf, −br }
{ av, −bb, −ap, −bc, au, aw, −ba, −aq, −bd, at, ax, −az, −ar, −be, as, ay, −ay, −as, be, ar, az, −ax, −at, bd, aq, ba, −aw, −au, bc, ap, bb, −av, −av, bb, ap, bc, −au, −aw, ba, aq, bd, −at, −ax, az, ar, be, −as, −ay, ay, as, −be, −ar, −az, ax, at, −bd, −aq, −ba, aw, au, −bc, −ap, −bb, av }
{ bs, −cc, −bi, −cj, bl, bz, −bv, −bp, cf, bf, cg, −bo, −bw, by, bm, −ci, −bh, −cd, br, bt, −cb, −bj, −ck, bk, ca, −bu, −bq, ce, bg, ch, −bn, −bx, bx, bn, −ch, −bg, −ce, bq, bu, −ca, −bk, ck, bj, cb, −bt, −br, cd, bh, ci, −bm, −by, bw, bo, −cg, −bf, −cf, bp, bv, −bz, −bl, cj, bi, cc, −bs }
{ ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak, ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak }
{ bt, −bz, −bn, cf, bh, ck, −bi, −ce, bo, by, −bu, −bs, ca, bm, −cg, −bg, −cj, bj, cd, −bp, −bx, bv, br, −cb, −bl, ch, bf, ci, −bk, −cc, bq, bw, −bw, −bq, cc, bk, −ci, −bf, −ch, bl, cb, −br, −bv, bx, bp, −cd, −bj, cj, bg, cg, −bm, −ca, bs, bu, −by, −bo, ce, bi, −ck, −bh, −cf, bn, bz, −bt }
{ aw, −ay, −au, ba, as, −bc, −aq, be, ap, bd, −ar, −bb, at, az, −av, −ax, ax, av, −az, −at, bb, ar, −bd, −ap, −be, aq, bc, −as, −ba, au, ay, −aw, −aw, ay, au, −ba, −as, bc, aq, −be, −ap, −bd, ar, bb, −at, −az, av, ax, −ax, −av, az, at, −bb, −ar, bd, ap, be, −aq, −bc, as, ba, −au, −ay, aw }
{ bu, −bw, −bs, by, bq, −ca, −bo, cc, bm, −ce, −bk, cg, bi, −ci, −bg, ck, bf, cj, −bh, −ch, bj, cf, −bl, −cd, bn, cb, −bp, −bz, br, bx, −bt, −bv, bv, bt, −bx, −br, bz, bp, −cb, −bn, cd, bl, −cf, −bj, ch, bh, −cj, −bf, −ck, bg, ci, −bi, −cg, bk, ce, −bm, −cc, bo, ca, −bq, −by, bs, bw, −bu }
{ aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa }
{ bv, −bt, −bx, br, bz, −bp, −cb, bn, cd, −bl, −cf, bj, ch, −bh, −cj, bf, −ck, −bg, ci, bi, −cg, −bk, ce, bm, −cc, −bo, ca, bq, −by, −bs, bw, bu, −bu, −bw, bs, by, −bq, −ca, bo, cc, −bm, −ce, bk, cg, −bi, −ci, bg, ck, −bf, cj, bh, −ch, −bj, cf, bl, −cd, −bn, cb, bp, −bz, −br, bx, bt, −bv }
{ ax, −av, −az, at, bb, −ar, −bd, ap, −be, −aq, bc, as, −ba, −au, ay, aw, −aw, −ay, au, ba, −as, −bc, aq, be, −ap, bd, ar, −bb, −at, az, av, −ax, −ax, av, az, −at, −bb, ar, bd, −ap, be, aq, −bc, −as, ba, au, −ay, −aw, aw, ay, −au, −ba, as, bc, −aq, −be, ap, −bd, −ar, bb, at, −az, −av, ax }
{ bw, −bq, −cc, bk, ci, −bf, ch, bl, −cb, −br, bv, bx, −bp, −cd, bj, cj, −bg, cg, bm, −ca, −bs, bu, by, −bo, −ce, bi, ck, −bh, cf, bn, −bz, −bt, bt, bz, −bn, −cf, bh, −ck, −bi, ce, bo, −by, −bu, bs, ca, −bm, −cg, bg, −cj, −bj, cd, bp, −bx, −bv, br, cb, −bl, −ch, bf, −ci, −bk, cc, bq, −bw }
{ al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al, al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al }
{ bx, −bn, −ch, bg, −ce, −bq, bu, ca, −bk, −ck, bj, −cb, −bt, br, cd, −bh, ci, bm, −by, −bw, bo, cg, −bf, cf, bp, −bv, −bz, bl, cj, −bi, cc, bs, −bs, −cc, bi, −cj, −bl, bz, bv, −bp, −cf, bf, −cg, −bo, bw, by, −bm, −ci, bh, −cd, −br, bt, cb, −bj, ck, bk, −ca, −bu, bq, ce, −bg, ch, bn, −bx }
{ ay, −as, −be, ar, −az, −ax, at, bd, −aq, ba, aw, −au, −bc, ap, −bb, −av, av, bb, −ap, bc, au, −aw, −ba, aq, −bd, −at, ax, az, −ar, be, as, −ay, −ay, as, be, −ar, az, ax, −at, −bd, aq, −ba, −aw, au, bc, −ap, bb, av, −av, −bb, ap, −bc, −au, aw, ba, −aq, bd, at, −ax, −az, ar, −be, −as, ay }
{ by, −bk, cj, bn, −bv, −cb, bh, −cg, −bq, bs, ce, −bf, cd, bt, −bp, −ch, bi, −ca, −bw, bm, ck, −bl,

-continued bx, bz, −bj, ci, bo, −bu, −cc, bg, −cf, −br, br, cf, −bg, cc, bu, −bo, −ci, bj, −bz, −bx, bl, −ck, −bm, bw, ca, −bi, ch, bp, −bt, −cd, bf, −ce, −bs, bq, cg, −bh, cb, bv, −bn, −cj, bk, −by }
{ af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af }
{ bz, −bh, ce, bu, −bm, cj, bp, −br, −ch, bk, −bw, −cc, bf, −cb, −bx, bj, −cg, −bs, bo, ck, −bn, bt, cf, −bi, by, ca, −bg, cd, bv, −bl, ci, bq, −bq, −ci, bl, −bv, −cd, bg, −ca, −by, bi, −cf, −bt, bn, −ck, −bo, bs, cg, −bj, bx, cb, −bf, cc, bw, −bk, ch, br, −bp, −cj, bm, −bu, −ce, bh, −bz }
{ az, −ap, ba, ay, −aq, bb, ax, −ar, bc, aw, −as, bd, av, −at, be, au, −au, −be, at, −av, −bd, as, −aw, −bc, ar, −ax, −bb, aq, −ay, −ba, ap, −az, −az, ap, −ba, −ay, aq, −bb, −ax, ar, −bc, −aw, as, −bd, −av, at, −be, −au, au, be, −at, av, bd, −as, aw, bc, −ar, ax, bb, −aq, ay, ba, −ap, az }
{ ca, −bf, bz, cb, −bg, by, cc, −bh, bx, cd, −bi, bw, ce, −bj, bv, cf, −bk, bu, cg, −bl, bt, ch, −bm, bs, ci, −bn, br, cj, −bo, bq, ck, −bp, bp, −ck, −bq, bo, −cj, −br, bn, −ci, −bs, bm, −ch, −bt, bl, −cg, −bu, bk, −cf, −bv, bj, −ce, −bw, bi, −cd, −bx, bh, −cc, −by, bg, −cb, −bz, bf, −ca }
{ am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am, am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am }
{ cb, −bi, bu, ci, −bp, bn, −cg, −bw, bg, −bz, −cd, bk, −bs, −ck, br, −bl, ce, by, −bf, bx, cf, −bm, bq, −cj, −bt, bj, −cc, −ca, bh, −bv, −ch, bo, −bo, ch, bv, −bh, ca, cc, −bj, bt, cj, −bq, bm, −cf, −bx, bf, −by, −ce, bl, −br, ck, bs, −bk, cd, bz, −bg, bw, cg, −bn, bp, −ci, −bu, bi, −cb }
{ ba, −ar, av, −be, −aw, aq, −az, −bb, as, −au, bd, ax, −ap, ay, bc, −at, at, −bc, −ay, ap, −ax, −bd, au, −as, bb, az, −aq, aw, be, −av, ar, −ba, −ba, ar, −av, be, aw, −aq, az, bb, −as, au, −bd, −ax, ap, −ay, −bc, at, −at, bc, ay, −ap, ax, bd, −au, as, −bb, −az, aq, −aw, −be, av, −ar, ba }
{ cc, −bl, bp, −cg, −by, bh, −bt, ck, bu, −bg, bx, ch, −bq, bk, −cb, −cd, bm, −bo, cf, bz, −bi, bs, −cj, −bv, bf, −bw, −ci, br, −bj, ca, ce, −bn, bn, −ce, −ca, bj, −br, ci, bw, −bf, bv, cj, −bs, bi, −bz, −cf, bo, −bm, cd, cb, −bk, bq, −ch, −bx, bg, −bu, −ck, bt, −bh, by, cg, −bp, bl, −cc }
{ ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac }
{ cd, −bo, bk, −bz, −ch, bs, −bg, bv, −ck, −bw, bh, −br, cg, ca, −bl, bn, −cc, −ce, bp, −bj, by, ci, −bt, bf, −bu, cj, bx, −bi, bq, −cf, −cb, bm, −bm, cb, cf, −bq, bi, −bx, −cj, bu, −bf, bt, −ci, −by, bj, −bp, ce, cc, −bn, bl, −ca, −cg, br, −bh, bw, ck, −bv, bg, −bs, ch, bz, −bk, bo, −cd }
{ bb, −au, aq, −ax, be, ay, −ar, at, −ba, −bc, av, −ap, aw, −bd, −az, as, −as, az, bd, −aw, ap, −av, bc, ba, −at, ar, −ay, −be, ax, −aq, au, −bb, −bb, au, −aq, ax, −be, −ay, ar, −at, ba, bc, −av, ap, −aw, bd, az, −as, as, −az, −bd, aw, −ap, av, −bc, −ba, at, −ar, ay, be, −ax, aq, −au, bb }
{ ce, −br, bf, −bs, cf, cd, −bq, bg, −bt, cg, cc, −bp, bh, −bu, ch, cb, −bo, bi, −bv, ci, ca, −bn, bj, −bw, cj, bz, −bm, bk, −bx, ck, by, −bl, bl, −by, −ck, bx, −bk, bm, −bz, −cj, bw, −bj, bn, −ca, −ci, bv, −bi, bo, −cb, −ch, bu, −bh, bp, −cc, −cg, bt, −bg, bq, −cd, −cf, bs, −bf, br, −ce }
{ an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an, an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an }
{ cf, −bu, bj, −bl, bw, −ch, −cd, bs, −bh, bn, −by, cj, cb, −bq, bf, −bp, ca, ck, −bz, bo, −bg, br, −cc, −ci, bx, −bm, bi, −bt, ce, cg, −bv, bk, −bk, bv, −cg, −ce, bt, −bi, bm, −bx, ci, cc, −br, bg, −bo, bz, −ck, −ca, bp, −bf, bq, −cb, −cj, by, −bn, bh, −bs, cd, ch, −bw, bl, −bj, bu, −cf }
{ bc, −ax, as, −aq, av, −ba, −be, az, −au, ap, −at, ay, −bd, −bb, aw, −ar, ar, −aw, bb, bd, −ay, at, −ap, au, −az, be, ba, −av, aq, −as, ax, −bc, −bc, ax, −as, aq, −av, ba, be, −az, au, −ap, at, −ay, bd, bb, −aw, ar, −ar, aw, −bb, −bd, ay, −at, ap, −au, az, −be, −ba, av, −aq, as, −ax, bc }
{ cg, −bx, bo, −bf, bn, −bw, cf, ch, −by, bp, −bg, bm, −bv, ce, ci, −bz, bq, −bh, bl, −bu, cd, cj, −ca, br, −bi, bk, −bt, cc, ck, −cb, bs, −bj, bj, −bs, cb, −ck, −cc, bt, −bk, bi, −br, ca, −cj, −cd, bu, −bl, bh, −bq, bz, −ci, −ce, bv, −bm, bg, −bp, by, −ch, −cf, bw, −bn, bf, −bo, bx, −cg }
{ ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag }
{ ch, −ca, bt, −bm, bf, −bl, bs, −bz, cg, ci, −cb, bu, −bn, bg, −bk, br, −by, cf, cj, −cc, bv, −bo, bh, −bj, bq, −bx, ce, ck, −cd, bw, −bp, bi, −bi, bp, −bw, cd, −ck, −ce, bx, −bq, bj, −bh, bo, −bv, cc, −cj, −cf, by, −br, bk, −bg, bn, −bu, cb, −ci, −cg, bz, −bs, bl, −bf, bm, −bt, ca, −ch }
{ bd, −ba, ax, −au, ar, −ap, as, −av, ay, −bb, be, bc, −az, aw, −at, aq, −aq, at, −aw, az, −bc, −be, bb, −ay, av, −as, ap, −ar, au, −ax, ba, −bd, −bd, ba, −ax, au, −ar, ap, −as, av, −ay, bb, −be, −bc, az, −aw, at, −aq, aq, −at, aw, −az, bc, be, −bb, ay, −av, as, −ap, ar, −au, ax, −ba, bd }
{ ci, −cd, by, −bt, bo, −bj, bf, −bk, bp, −bu, bz, −ce, cj, ch, −cc, bx, −bs, bn, −bi, bg, −bl, bq, −bv, ca, −cf, ck, cg, −cb, bw, −br, bm, −bh, bh, −bm, br, −bw, cb, −cg, −ck, cf, −ca, bv, −bq, bl, −bg, bi, −bn, bs, −bx, cc, −ch, −cj, ce, −bz, bu, −bp, bk, −bf, bj, −bo, bt, −by, cd, −ci }
{ ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao, ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao }
{ cj, −cg, cd, −ca, bx, −bu, br, −bo, bl, −bi, bf, −bh, bk, −bn, bq, −bt, bw, −bz, cc, −cf, ci, ck, −ch, ce, −cb, by, −bv, bs, −bp, bm, −bj, bg, −bg, bj, −bm, bp, −bs, bv, −by, cb, −ce, ch, −ck, −ci, cf, −cc, bz, −bw, bt, −bq, bn, −bk, bh, −bf, bi, −bl, bo, −br, bu, −bx, ca, −cd, cg, −cj }
{ be, −bd, bc, −bb, ba, −az, ay, −ax, aw, −av, au, −at, as, −ar, aq, −ap, ap, −aq, ar, −as, at, −au, av, −aw, ax, −ay, az, −ba, bb, −bc, bd, −be, −be, bd, −bc, bb, −ba, az, −ay, ax, −aw, av, −au, at, −as, ar, −aq, ap, −ap, aq, −ar, as, −at, au, −av, aw, −ax, ay, −az, ba, −bb, bc, −bd, be }
{ ck, −cj, ci, −ch, cg, −cf, ce, −cd, cc, −cb, ca, −bz, by, −bx, bw, −bv, bu, −bt, bs, −br, bq, −bp, bo, −bn, bm, −bl, bk, −bj, bi, −bh, bg, −bf, bf, −bg, bh, −bi, bj, −bk, bl, −bm, bn, −bo, bp, −bq, br, −bs, bt, −bu, bv, −bw, bx, −by, bz, −ca, cb, −cc, cd, −ce, cf, −cg, ch, −ci, cj, −ck }
} where {aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck}={64,83, 36,89,75,50,18,90,87,80,70,57,43,25,9,90,90,88,85,82,78, 73,67,61,54,46,38,31,22,13,4,9 1,90,90,90,88,87,86,84,83, 81,79,77,73,71,69,65,62,59,56,52,48,44,41,37,33,28,24,20, 15,11,7,2}

In addition to DCT-2 and 4×4 DST-7 which have been employed in HEVC, an Adaptive Multiple Transform (AMT, or as known as Enhanced Multiple Transform (EMT), or as known as Multiple Transform Selection (MTS)) scheme has been used in VVC for residual coding for both inter and intra coded blocks. The MTS uses multiple selected transforms from the DCT/DST families other than the current transforms in HEVC. The newly introduced transform matrices are DST-7, DCT-8. Table 2 shows the basis functions of the selected DST/DCT.

TABLE 2

Transform basis functions of DCT-2, DST-7 and DCT-8 for N-point input

| Transform Type | Basis function $T_i(j)$, i, j = 0, 1, . . . , N − 1 |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ |
| | where $\omega_0 = \begin{cases} \sqrt{\frac{2}{N}} & i = 0 \\ 1 & i \neq 0 \end{cases}$ |
| DCT-8 | $T_i(j) = \sqrt{\frac{4}{2N+1}} \cdot \cos\left(\frac{\pi \cdot (2i+1) \cdot (2j+1)}{4N+2}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |

All the primary transform matrices in VVC may be used with 8-bit representation. The AMT applies to the CUs with both width and height smaller than or equal to 32, and whether applying AMT or not is controlled by a flag called mts_flag. When the mts_flag is equal to 0, only DCT-2 may be applied for coding the residue. When the mts_flag is equal to 1, an index mts_idx is further signalled using 2 bins to specify the horizontal and vertical transform to be used according to Table 3, where value 1 means using DST-7 and value 2 means using DCT-8.

TABLE 3

Specification of trTypeHor and trTypeVer depending on mts_idx[ x ][ y ][ cIdx ]

| mts_idx[ xTbY ][ yTbY ][ cIdx ] | trTypeHor | trTypeVer |
|---|---|---|
| −1 | 0 | 0 |
| 0 | 1 | 1 |
| 1 | 2 | 1 |
| 2 | 1 | 2 |
| 3 | 2 | 2 |

In VVC Draft 4, an implicit MTS may also be applied in case that the above signaling based MTS (i.e., explicit MTS) is not used. With implicit MTS, the transform selection is made according to the block width and height instead of signaling. More specifically, with implicit MTS as proposed in JVET-M0303, DST-7 is selected for the shorter side of block and DCT-2 is selected for the longer side of block. The transform core, which is a matrix composed by the basis vectors, of DST-7 can be also represented below:

4-point DST-7:

{a, b, c, d}
{c, c, 0, −c}
{d, −a, −c, b}
{b, −d, c, −a}
where {a, b, c, d} = {29, 55, 74, 84} .

8-point DST-7:

{a, b, c, d, e, f, g, h, }
{c, f, h, e, b, −a, −d, −g, }
{e, g, b, −c, −h, −d, a, f, }
{g, c, −d, −f, a, h, b, −e, }
{h, −a, −g, b, f, −c, −e, d, }
{f, −e, −a, g, −d, −b, h, −c, }
{d, −h, e, −a, −c, g, −f, b, }
{b, −d, f, −h, g, −e, c, −a, }
where {a, b, c, d, e, f, g, h} = {17, 32, 46, 60, 71, 78, 85, 86}.

16-point DST-7:

{a, b, c, d, e, f, g, h, i, j, k, l, m, n, o, p, }
{c, f, i, l, o, o, l, i, f, c, 0, −c, −f, −i, −l, −o, }
{e, j, o, m, h, c, −b, −g, −l, −p, −k, −f, −a, d, i, n, }
{g, n, l, e, −b, −i, −p, −j, −c, d, k, o, h, a, −f, −m, }
{i, o, f, −c, −l, −l, −c, f, o, i, 0, −i, −o, −f, c, l, }
{k, k, 0, −k, −k, 0, k, k, 0, −k, −k, 0, k, k, 0, −k, }
{m, g, −f, −n, −a, l, h, −e, −o, −b, k, i, −d, −p, −c, j, }
{o, c, −l, −f, i, i, −f, −l, c, o, 0, −o, −c, l, f, −i, }
{p, −a, −o, b, n, −c, −m, d, l, −e, −k, f, j, −g, −i, h, }
{n, −e, −i, j, d, −o, a, m, −f, −h, k, c, −p, b, l, −g, }
{l, −i, −c, o, −f, −f, o, −c, −i, l, 0, −l, i, c, −o, f, }

-continued

{j, −m, c, g, −p, f, d, −n, i, a, −k, l, −b, −h, o, −e, }
{h, −p, i, −a, −g, o, −j, b, f, −n, k, −c, −e, m, −l, d, }
{f, −l, o, −i, c, c, −i, o, −l, f, 0, −f, l, −o, i, −c, }
{d, −h, l, −p, m, −i, e, −a, −c, g, −k, o, −n, j, −f, b, }
{b, −d, f, −h, j, −l, n, −p, o, −m, k, −i, g, −e, c, −a, }
where {a, b, c, d, e, f, g, h, i, j, k, l, m, n, o, p} = {9, 17, 25, 33, 41, 49, 56, 62, 66, 72, 77, 81, 83, 87, 89, 90}.

32-point DST-7:

{a, b, c, d, e, f, g, h, i, j, k, l, m, n, o, p, q, r, s, t, u, v, w, x, y, z, A, B, C, D, E, F, }
{c, f, i, 1, o, r, u, x, A, D, F, C, z, w, t, q, n, k, h, e, b, −a, −d, −g, −j, −m, −p, −s, −v, −y, −B, −E, }
{e, j, o, t, y, D, D, y, t, o, j, e, 0, −e, −j, −o, −t, −y, −D, −D, −y, −t, −o, −j, −e, 0, e, j, o, t, y, D, }
{g, n, u, B, D, w, p, i, b, −e, −1, −s, −z, −F, −y, −r, −k, −d, c, j, q, x, E, A, t, m, f, −a, −h, −o, −v, −C, }
{i, r, A, C, t, k, b, −g, −p, −y, −E, −v, −m, −d, e, n, w, F, x, o, f, −c, −1, −u, −D, −z, −q, −h, a, j, s, B, }
{k, v, F, u, j, −a, −1, −w, −E, −t, −i, b, m, x, D, s, h, −c, −n, −y, −C, −r, −g, d, o, z, B, q, f, −e, −p, −A, }
{m, z, z, m, 0, −m, −z, −z, −m, 0, m, z, z, m, 0, −m, −z, −z, −m, 0, m, z, z, m, 0, −m, −z, −z, −m, 0, m, z, }
{o, D, t, e, −j, −y, −y, −j, e, t, D, o, 0, −o, −D, −t, −e, j, y, y, j, −e, −t, −D, −0, 0, o, D, t, e, −j, −y, }
{q, E, n, −c, −t, −B, −k, f, w, y, h, −i, −z, −v, −e, 1, C, s, b, −o, −F, −p, a, r, D, m, −d, −u, −A, −j, g, x, }
{s, A, h, −k, −D, −p, c, v, x, e, −n, −F, −m, f, y, u, b, −q, −C, −j, i, B, r, −a, −t, −z, −g, 1, E, o, −d, −w, }
{u, w, b, −s, −y, −d, q, A, f, −o, −C, −h, m, E, j, −k, −F, −1, i, D, n, −g, −B, −p, e, z, r, −c, −x, −t, a, v, }
{w, s, −d, −A, −o, h, E, k, −1, −D, −g, p, z, c, −t, −v, a, x, r, −e, −B, −n, i, F, j, −m, −C, −f, q, y, b, −u, }
{y, o, −j, −D, −e, t, t, −e, −D, −j, o, y, 0, −y, −o, j, D, e, −t, −t, e, D, j, −o, −y, 0, y, o, −j, −D, −e, t, }
{A, k, −p, −v, e, F, f, −u, −q, j, B, a, −z, −1, o, w, −d, −E, −g, t, r, −i, −C, −b, y, m, −n, −x, c, D, h, −s, }
{C, g, −v, −n, o, u, −h, −B, a, D, f, −w, −m, p, t, −i, −A, b, E, e, −x, −1, q, s, −j, −z, c, F, d, −y, −k, r, }
{E, c, −B, −f, y, i, −v, −1, s, o, −p, −r, m, u, −j, −x, g, A, −d, −D, a, F, b, −C, −e, z, h, −w, −k, t, n, −q, }
{F, −a, −E, b, D, −c, −C, d, B, −e, −A, f, z, −g, −y, h, x, −i, −w, j, v, −k, −u, 1, t, −m, −s, n, r, −o, −q, p, }
{D, −e, −y, j, t, −o, −o, t, j, −y, −e, D, 0, −D, e, y, −j, −t, o, o, −t, −j, y, e, −D, 0, D, −e, −y, j, t, −o, }
{B, −i, −s, r, j, −A, −a, C, −h, −t, q, k, −z, −b, D, −g, −u, p, 1, −y, −c, E, −f, −v, o, m, −x, −d, F, −e, −w, n, }
{z, −m, −m, z, 0, −z, m, m, −z, 0, z, −m, −m, z, 0, −z, m, m, −z, 0, z, −m, −m, z, 0, −z, m, m, −z, 0, z, −m, }
{x, −q, −g, E, −j, −n, A, −c, −u, t, d, −B, m, k, −D, f, r, −w, −a, y, −p, −h, F, −i, −o, z, −b, −v, s, e, −C, 1, }
{v, −u, −a, w, −t, −b, x, −s, −c, y, −r, −d, z, −q, −e, A, −p, −f, B, −o, −g, C, −n, −h, D, −m, −i, E, −l, −j, F, −k, }
{t, −y, e, o, −D, j, j, −D, o, e, −y, t, 0, −t, y, −e, −o, D, −j, −j, D, −o, −e, y, −t, 0, t, −y, e, o, −D, j, }
{r, −C, k, g, −y, v, −d, −n, F, −o, −c, u, −z, h, j, −B, s, −a, −q, D, −1, −f, x, −w, e, m, −E, p, b, −t, A, −i, }
{p, −F, q, −a, −o, E, −r, b, n, −D, s, −c, −m, C, −t, d, 1, −B, u, −e, −k, A, −v, f, j, −z, w, −g, −i, y, −x, h, }
{n, −B, w, −i, −e, s, −F, r, −d, −j, x, −A, m, a, −o, C, −v, h, f, −t, E, −q, c, k, −y, z, −1, −b, p, −D, u, −g, }
{l, −x, C, −q, e, g, −s, E, −v, j, b, −n, z, −A, o, −c, −i, u, −F, t, −h, −d, p, −B, y, −m, a, k, −w, D, −r, f, }
{j, −t, D, −y, o, −e, −e, o, −y, D, −t, j, 0, −j, t, −D, y, −o, e, e, −o, y, −D, t, −j, 0, j, −t, D, −y, o, −e, }
{h, −p, x, −F, y, −q, i, −a, −g, o, −w, E, −z, r, −j, b, f, −n, v, −D, A, −s, k, −c, −e, m, −u, C, −B, t, −l, d, }
{f, −1, r, −x, D, −C, w, −q, k, −e, −a, g, −m, s, −y, E, −B, v, −p, j, −d, −b, h, −n, t, −z, F, −A, u, −o, i, −c, }
{d, −h, 1, −p, t, −x, B, −F, C, −y, u, −q, m, −i, e, −a, −c, g, −k, o, −s, w, −A, E, −D, z, −v, r, −n, j, −f, b, }
{b, −d, f, −h, j, −1, n, −p, r, −t, v, −x, z, −B, D, −F, E, −C, A, −y, w, −u, s, −q, o, −m, k, −i, g, −e, c, −a, }
where {a, b, c, d, e, f, g, h, i, j, k, l, m, n, o, p, q, r, s, t, u, v, w, x, y, z, A, B, C, D, E, F} = {4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90}.

-continued 4-point DCT-8:

{a, b, c, d, }
{b, 0, −b, −b, }
{c, −b, −d, a, }
{d, −b, a, −c, }
where {a, b, c, d} = {84, 74, 55, 29}.
8-point DCT-8:
{a, b, c, d, e, f, g, h, }
{b, e, h, −g, −d, −a, −c, −f, }
{c, h, −e, −a, −f, g, b, d, }
{d, −g, −a, −h, c, e, −f, −b, }
{e, −d, −f, c, g, −b, −h, a, }
{f, −a, g, e, −b, h, d, −c, }
{g, −c, b, −f, −h, d, −a, e, }
{h, −f, d, −b, a, −c, e, −g, }
where {a, b, c, d, e, f, g, h} = {86, 85, 78, 71, 60, 46, 32, 17}.

16-point DCT-8:

{a, b, c, d, e, f, g, h, i, j, k, l, m, n, o, p, }
{b, e, h, k, n, 0, −n, −k, −h, −e, −b, −b, −e, −h, −k, −n, }
{c, h, m, −p, −k, −f, −a, −e, −j, −o, n, i, d, b, g, l, }
{d, k, −p, −i, −b, −f, −m, n, g, a, h, o, −l, −e, −c, −j, }
{e, n, −k, −b, −h, 0, h, b, k, −n, −e, −e, −n, k, b, h, }
{f, 0, −f, −f, 0, f, f, O, −f, −f, 0, f, f, 0, −f, −f, }
{g, −n, −a, −m, h, f, −o, −b, −l, i, e, −p, −c, −k, j, d, }
{h, −k, −e, n, b, 0, −b, −n, e, k, −h, −h, k, e, −n, −b, }
{i, −h, −j, g, k, −f, −l, e, m, −d, −n, c, o, −b, −p, a, }
{j, −e, −o, a, −n, −f, i, k, −d, −p, b, −m, −g, h, l, −c, }
{k, −b, n, h, −e, 0, e, −h, −n, b, −k, −k, b, −n, −h, e, }
{l, −b, i, o, −e, f, −p, −h, c, −m, −k, a, −j, −n, d, −g, }
{m, −e, d, −l, −n, f, −c, k, o, −g, b, −j, −p, h, −a, i, }
{n, −h, b, −e, k, 0, −k, e, −b, h, −n, −n, h, −b, e, −k, }
{o, −k, g, −c, b, −f, j, −n, −p, l, −h, d, −a, e, −i, m, }
{p, −n, l, −j, h, −f, d, −b, a, −c, e, −g, i, −k, m, −o, }
where {a, b, c, d, e, f, g, h, i, j, k, l, m, n, o, p} =
{90, 89, 87, 83, 1, 77, 72, 66, 62, 56, 49, 41, 33, 25, 1, 9}.

32-point DCT-8:

{a, b, c, d, e, f, g, h, i, j, k, l, m, n, o, p, q, r, s, t, u, v, w, x, y, z, A, B, C, D, E, F, }
{b, e, h, k, n, q, t, w, z, C, F, −E, −B, −y, −v, −s, −p, −m, −j, −g, −d, −a, −c, −f, −i, −l, −o, −r, −u, −x, −A, −D, }
{c, h, m, r, w, B, 0, −B, −w, −r, −m, −h, −c, −c, −h, −m, −r, −w, −B, O, B, w, r, m, h, c, c, h, m, r, w, B, }
{d, k, r, y, F, −A, −t, −m, −f, −b, −i, −p, −w, −D, C, v, o, h, a, g, n, u, B, −E, −x, −q, −j, −c, −e, −l, −s, −z, }
{e, n, w, F, −y, −p, −g, −c, −l, −u, −D, A, r, i, a, j, s, B, −C, −t, −k, −b, −h, −q, −z, E, v, m, d, f, o, x, }
{f, q, B, −A, −p, −e, −g, −r, −C, z, o, d, h, s, D, −y, −n, −c, −i, −t, −E, x, m, b, j, u, F, −w, −l, −a, −k, −v, }
{g, t, 0, −t, −g, −g, −t, 0, t, g, g, t, 0, −t, −g, −g, −t, 0, t, g, g, t, 0, −t, −g, −g, −t, 0, t, g, g, t, }
{h, w, −B, −m, −c, −r, O, r, c, m, B, −w, −h, −h, −w, B, m, c, r, 0, −r, −c, −m, −B, w, h, h, w, −B, −m, −c, −r, }
{i, z, −w, −f, −l, −C, t, c, o, F, −q, −a, −r, E, n, d, u, −B, −k, −g, −x, y, h, j, A, −v, −e, −m, −D, s, b, p, }
{j, C, −r, −b, −u, z, g, m, F, −o, −e, −x, w, d, p, −E, −l, −h, −A, t, a, s, −B, −i, −k, −D, q, c, v, −y, −f, −n, }
{k, F, −m, −i, −D, o, g, B, −q, −e, −z, s, c, x, −u, −a, −v, w, b, t, −y, −d, −r, A, f, p, −C, −h, −n, E, j, l, }
{l, −E, −h, −p, A, d, t, −w, −a, −x, s, e, B, −o, −i, −F, k, m, −D, −g, −q, z, c, u, −v, −b, −y, r, f, C, −n, −j, }
{m, −B, −c, −w, r, h, 0, −h, −r, w, c, B, −m, −m, B, c, w, −r, −h, O, h, r, −w, −c, −B, m, m, −B, −c, −w, r, h, }
{n, −y, −c, −D, i, s, −t, −h, E, d, x, −o, −m, z, b, C, −j, −r, u, g, −F, −e, −w, p, l, −A, −a, −B, k, q, −v, −f, }
{o, −v, −h, C, a, D, −g, −w, n, p, −u, −i, B, b, E, −f, −x, m, q, −t, −j, A, c, F, −e, −y, l, r, −s, −k, z, d, }
{p, −s, −m, v, j, −y, −g, B, d, −E, −a, −F, c, C, −f, −z, i, w, −l, −t, o, q, −r, −n, u, k, −x, −h, A, e, −D, −b, }
{q, −p, −r, o, s, −n, −t, m, u, −l, −v, k, w, −j, −x, i, y, −h, −z, g, A, −f, −B, e, C, −d, −D, c, E, −b, −F, a, }
{r, −m, −w, h, B, −c, O, c, −B, −h, w, m, −r, −r, m, w, −h, −B, c, 0, −c, B, h, −w, −m, r, r, −m, −w, h, B, −c, }
{s, −j, −B, a, −C, −i, t, r, −k, −A, b, −D, −h, u, q, −l, −z, c, −E, −g, v, p, −m, −y, d, −F, −f, w, o, −n, −x, e, }

-continued

```
{t, −g, 0, g, −t, −t, g, 0, −g, t, t, −g, 0, g, −t, −t, g, 0, −g, t, t, −g, 0, g, −t, −t, g, 0, −g, t, t, −g, }
{u, −d, B, n, −k, −E, g, −r, −x, a, −y, −q, h, −F, −j, o, A, −c, v, t, −e, C, m, −l, −D, f, −s, −w, b, −z, −p, i, }
{v, −a, w, u, −b, x, t, −c, y, s, −d, z, r, −e, A, q, −f, B, p, −g, C, o, −h, D, n, −i, E, m, −j, F, l, −k, }
{w, −c, r, B, −h, m, 0, −m, h, −B, −r, c, −w, −w, c, −r, −B, h, −m, 0, m, −h, B, r, −c, w, w, −c, r, B, −h, m, }
{x, −f, m, −E, −q, b, −t, −B, j, −i, A, u, −c, p, F, −n, e, −w, −y, g, −l, D, r, −a, s, C, −k, h, −z, −v, d, −o, }
{y, −i, h, −x, −z, j, −g, w, A, −k, f, −v, −B, l, −e, u, C, −m, d, −t, −D, n, −c, s, E, −o, b, −r, −F, p, −a, q, }
{z, −l, c, −q, E, u, −g, h, −v, −D, p, −b, m, −A, −y, k, −d, r, −F, −t, f, −i, w, C, −o, a, −n, B, x, −j, e, −s, }
{A, −o, c, −j, v, F, −t, h, −e, q, −C, −y, m, −a, l, −x, −D, r, −f, g, −s, E, w, −k, b, −n, z, B, −p, d, −i, u, }
{B, −r, h, −c, m, −w, 0, w, −m, c, −h, r, −B, −B, r, −h, c, −m, w, 0, −w, m, −c, h, −r, B, B, −r, h, −c, m, −w, }
{C, −u, m, −e, d, −l, t, −B, −D, v, −n, f, −c, k, −s, A, E, −w, o, −g, b, −j, r, −z, −F, x, −p, h, −a, i, −q, y, }
{D, −x, r, −l, f, −a, g, −m, s, −y, E, C, −w, q, −k, e, −b, h, −n, t, −z, F, B, −v, p, −j, d, −c, i, −o, u, −A, }
{E, −A, w, −s, o, −k, g, −c, b, −f, j, −n, r, −v, z, −D, −F, B, −x, t, −p, l, −h, d, −a, e, −i, m, −q, u, −y, C, }
{F, −D, B, −z, x, −v, t, −r, p, −n, l, −j, h, −f, d, −b, a, −c, e, −g, i, −k, m, −o, q, −s, u, −w, y, −A, C, −E, }
where {a, b, c, d, e, f, g, h, i, j, k, l, m, n, o, p, q, r, s, t, u, v, w, x, y, z, A, B, C, D, E, F} =
{90, 90, 89, 88, 88, 86, 85, 84, 82, 80, 78, 77, 74, 72, 68, 66, 63, 60, 56, 53, 50, 45, 42, 38, 34, 30, 26, 21, 17, 13, 9, 4}.
```

In VVC, in some examples, when both the height and width of the coding block is smaller than or equal to 64, the transform size can be always the same as the coding block size. When either the height or width of the coding block is larger than 64, when doing the transform or intra prediction, the coding block is further split into multiple sub-blocks, where the width and height of each sub-block is smaller than or equal to 64, and one transform is performed on each sub-block.

In VVC Draft v5, MTS can be enabled or disabled in SPS with the following syntaxes in Table 4.

TABLE 4

Syntax for enabling MTS in SPS

| | Descriptor |
|---|---|
| seq_parameter_set_rbsp( ) { | |
| … … | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| … … | |

In VVC Draft v5, for some cases, DST-7 and/or DCT-8 can be used without being explicitly signaled, i.e., DST-7 and/or DCT-8 can be used implicitly based on information that is available for both encoder and decoder. These cases include:

(a) Intra Sub-Partitioning (ISP): For ISP mode, the horizontal transform is selected as DST-7 as long as the block width is greater than or equal to 4 and less than or equal to 16, and the vertical transform is selected as DST-7 as long as the block height is greater than or equal to 4 and less than or equal to 16.

(b) Sub-Block Transform (SBT): For SBT mode, for sub-TU located at the left half (or quarter) and right half (or quarter) of current CU, the horizontal transform is DCT-8 and DST-7, respectively. Otherwise, when sub-TU has same width with current CU, DCT-2 is used. For sub-TU located at the top half (or quarter) and bottom half (or quarter) of current CU, the vertical transform is DCT-8 and DST-7, respectively. Otherwise, when sub-TU has same height with current CU, DCT-2 is used.

(c) MTS disabled in SPS: When sps_mts_enabled_flag is signaled as true, but both sps_explicit_mts_intra_enabled_flag and sps_explicit_mts_inter_enabled_flag are signaled as false, for intra prediction residuals, the horizontal transform is selected as DST-7 as long as the block width is greater than or equal to 4 and less than or equal to 16, and the vertical transform is selected as DST-7 as long as the block height is greater than or equal to 4 and less than or equal to 16.

In VVC, a mode-dependent non-separable secondary transform (NSST) can be applied between the forward core transform and quantization (at the encoder), and between the de-quantization and inverse core transform (at the decoder). To keep low complexity, NSST is only applied to the low frequency coefficients after the primary transform. If both width (W) and height (H) of a transform coefficient block is larger than or equal to 8, then 8×8 non-separable secondary transform can be applied to the top-left 8×8 region of the transform coefficients block. Otherwise, if either W or H of a transform coefficient block is equal to 4, a 4×4 non-separable secondary transform can be applied and the 4×4 non-separable transform can be performed on the top-left min(8, W)×min(8, H) region of the transform coefficient block. The above transform selection rule can be applied for both luma and chroma components.

Matrix multiplication implementation of a non-separable transform is described as follows in formula (1) by using a 4×4 input block as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{321} & X_{22} & X_{23} \\ X_{30} & X_{31} & X_{32} & X_{33} \end{bmatrix} \quad (1)$$

is represented as a vector $\vec{X}$:

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T \quad (2)$$

The non-separable transform is calculated as $\vec{F} = \mathrm{T}\cdot\vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index can be placed with the smaller scanning index in the 4×4 coefficient block. In JEM, a Hypercube-Givens Transform (HyGT) with butterfly implementation is used instead of matrix multiplication to reduce the complexity of non-separable transform.

In one design of NSST, there can be totally 35×3 non-separable secondary transforms for both 4×4 and 8×8 block size, where 35 is the number of transform sets specified by the intra prediction mode, denoted as set, and 3 is the number of NSST candidate for each intra prediction mode. The mapping from the intra prediction mode to the transform set is defined in Table 5. The transform set applied to luma/chroma transform coefficients is specified by the corresponding luma/chroma intra prediction modes, according to Table 5. For intra prediction modes larger than 34 (diagonal prediction direction), the transform coefficient block is transposed before/after the secondary transform at the encoder/decoder.

For each transform set, the selected non-separable secondary transform candidate is further specified by the explicitly signalled CU-level NSST index. The index may be signalled in a bitstream one time for each intra CU after transform coefficients and truncated unary binarization is used. The truncated value is 2 in case of planar or DC mode, and 3 for angular intra prediction mode. This NSST index may be signalled only when there is more than one non-zero coefficient in a CU. The default value may be zero when it is not signalled. Zero value of this syntax element may indicate that the secondary transform is not applied to the current CU, values 1-3 indicates which secondary transform from the set should be applied.

In some embodiments, for each transform set, the selected non-separable secondary transform candidate can be further specified by the explicitly signalled CU-level NSST index. The index is signalled in a bitstream one time for each intra CU after transform coefficients and truncated unary binarization is used. The truncated value is 2 in case of planar or DC mode, and 3 for angular intra prediction mode. This NSST index is signalled only when there is more than one non-zero coefficient in a CU. The default value is zero when it is not signalled. Zero value of this syntax element indicates secondary transform is not applied to the current CU. Values 1-3 indicate which secondary transform from the set should be applied.

TABLE 5

| Mapping from intra prediction mode to transform set index | | | |
|---|---|---|---|
| intro mdoe | set | intro mode | set |
| 0 | 0 | 34 | 34 |
| 1 | 1 | 35 | 33 |
| 2 | 2 | 36 | 32 |
| 3 | 3 | 37 | 31 |
| 4 | 4 | 38 | 30 |
| 5 | 5 | 39 | 29 |
| 6 | 6 | 40 | 28 |
| 7 | 7 | 41 | 27 |
| 8 | 8 | 42 | 26 |
| 9 | 9 | 43 | 25 |
| 10 | 10 | 44 | 24 |
| 11 | 11 | 45 | 23 |
| 12 | 12 | 46 | 22 |
| 13 | 13 | 47 | 21 |
| 14 | 14 | 48 | 20 |
| 15 | 15 | 49 | 19 |
| 16 | 16 | 50 | 18 |
| 17 | 17 | 51 | 17 |
| 18 | 18 | 52 | 16 |
| 19 | 19 | 53 | 15 |
| 20 | 20 | 54 | 14 |
| 21 | 21 | 55 | 13 |
| 22 | 22 | 56 | 12 |
| 23 | 23 | 57 | 11 |
| 24 | 24 | 58 | 10 |
| 25 | 25 | 59 | 9 |
| 26 | 26 | 60 | 8 |
| 27 | 27 | 61 | 7 |
| 28 | 28 | 62 | 6 |
| 29 | 29 | 63 | 5 |
| 30 | 30 | 64 | 4 |
| 31 | 31 | 65 | 3 |
| 32 | 32 | 66 | 2 |
| 33 | 33 | 67 (LM) | Null |

Figure 10:
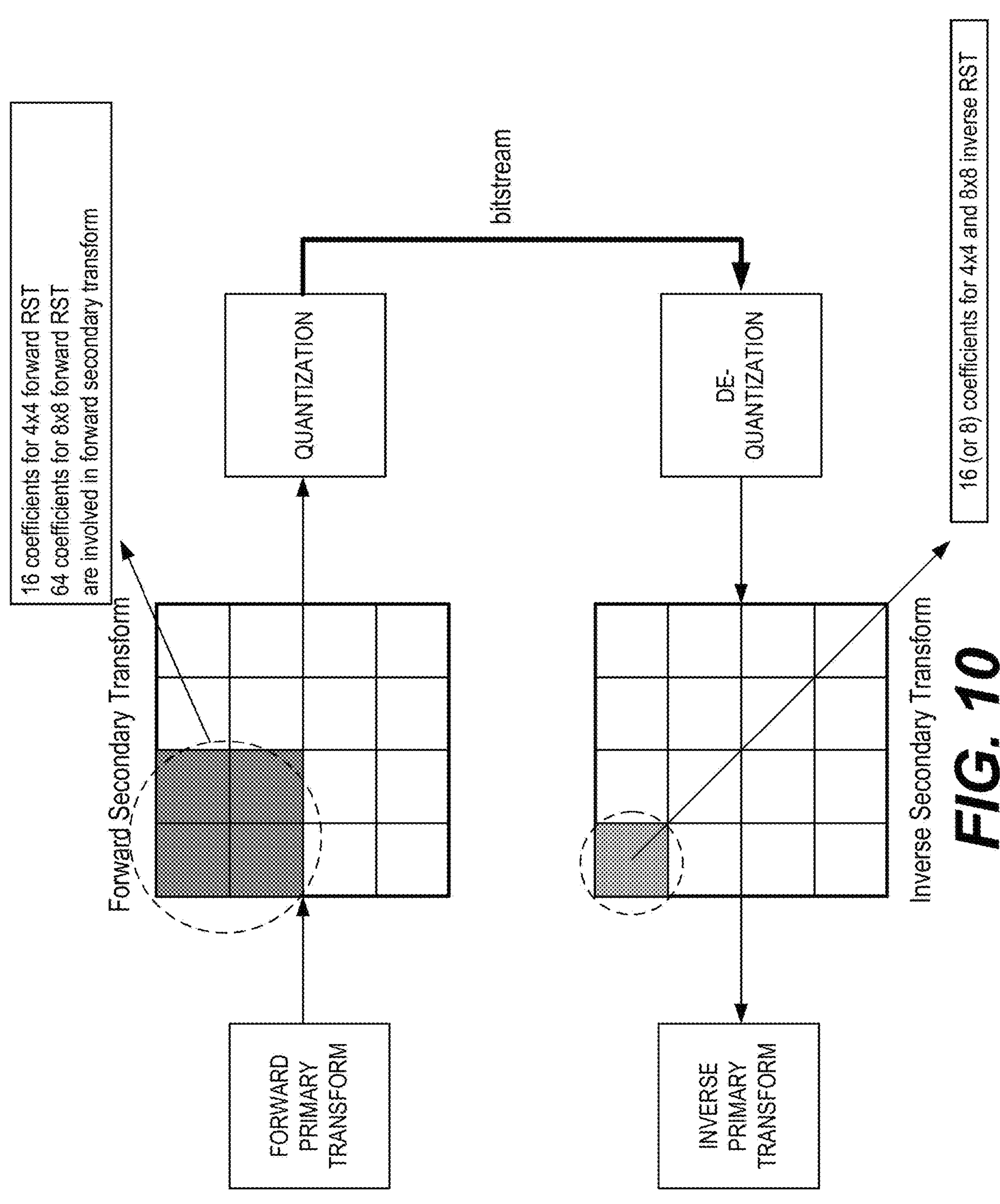
FIG. 10 shows a reduced secondary transform (RST) using a 16×64 secondary transform core.
Figure 11:
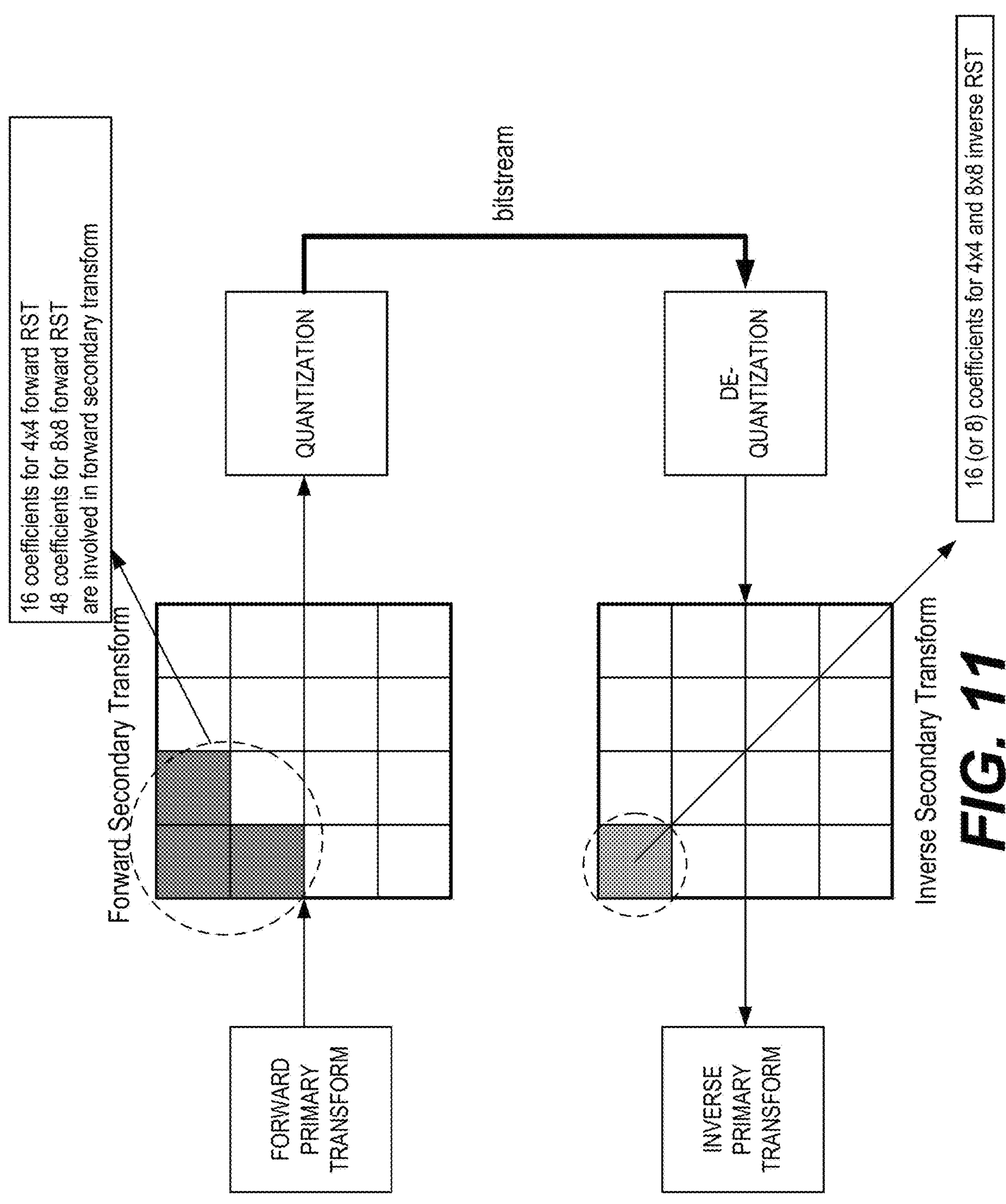
FIG. 11 shows a reduced secondary transform (RST) using a 16×48 secondary transform core.

A variant of NSST using transform zero-out scheme, namely Reduced Size Transform (RST), which is also called Low-Frequency Non-Separable Secondary Transform (LFNST) in VVC Draft 5, has been proposed in JVET-N0193. The JVET-N0193 checks whether the intra prediction mode is Planar or DC for entropy coding the transform index of NSST. In JVET-N0193, 4 transform sets are applied, and each transform set includes three RST transform cores. The three RST transform cores can be either size 16×48 (or 16×64) (applied for transform coefficient block with height and width both being greater than or equal to 8) or 16×16 (applied for transform coefficient block with either height or width being equal to 4). For notational convenience, the 16×48 (or 16×64) transform is denoted as RST8×8 and the 16×16 one as RST4×4. For RST8×8, the two alternatives using 16×64 transform cores and 16×48 transform cores are shown in FIG. 10 and FIG. 11, respectively. FIG. 10 shows a reduced secondary transform (RST) using 16×64 secondary transform core. FIG. 11 shows a reduced secondary transform (RST) using 16×48 secondary transform core. The transform using 16×48 transform cores is adopted in VVC Draft 5.

The index indicating the selection of LFNST kernel, i.e., lfnst_idx, is signaled at the end of CU-level syntax, as indicated in Table 6. Table 6 provides syntax at CU-level.

TABLE 6

Syntax of signaling an index for selection of LFNST kernel

```
                                                                    Descriptor
coding_unit( x0, y0, cbWidth, cbHeight, treeType ) {
... ...
      numSigCoeff = 0
      numZeroOutSigCoeff = 0
      transform_tree( x0, y0, cbWidth, cbHeight, treeType )
      lfnstWidth = ( treeType = = DUAL_TREE_CHROMA ) ?
             cbWidth / Sub WidthC : cbWidth
      lfnstHeight = ( treeType = = DUAL_TREE_CHROMA ) ?
             cbHeight / SubHeightC : cbHeight
      if( Min( IfnstWidth, IfnstHeight ) >= 4 && sps_lfnst_enabled_flag = = 1 &&
        CuPredMode[ x0 ][ y0 ] = = MODE_INTRA &&
        IntraSubPartitionsSplitType = = ISP_NO_SPLIT &&
        !intra_mip_flag[ x0 ][ y0 ] ) {
        if( ( numSigCoeff > ( ( treeType = = SINGLE_TREE ) ? 2 : 1) ) &&
          numZeroOutSigCoeff = = 0)
          lfnst_idx[ x0 ][ y0 ]                                     ae(v)
      }
    }
  }
}
```

Figures 12A, 12B:
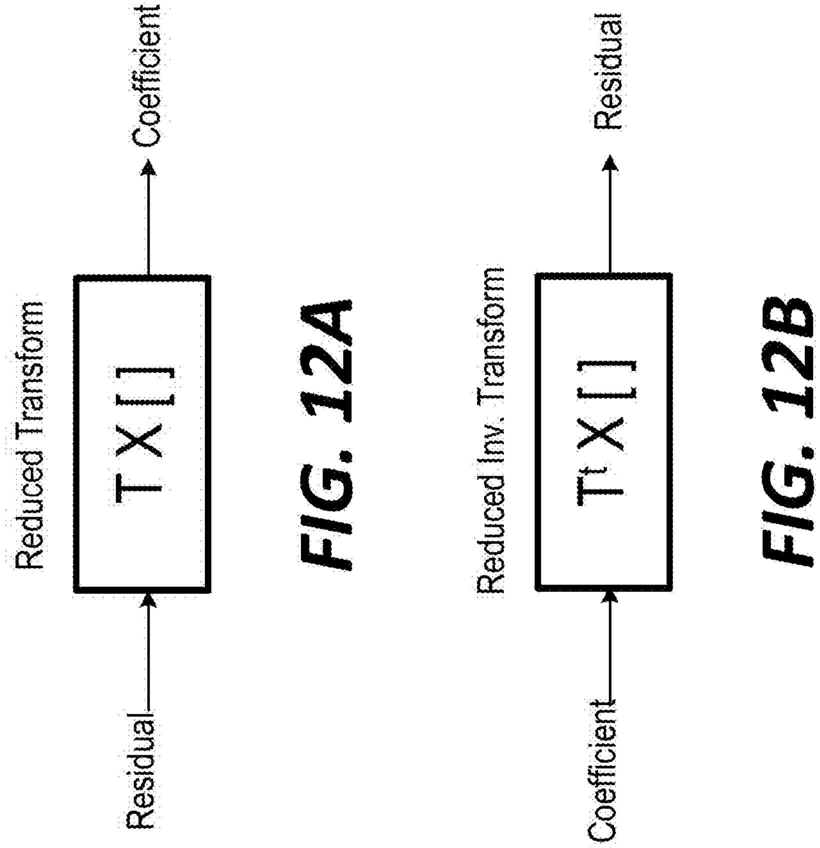
FIG. 12A shows a forward reduced transform.
FIG. 12B shows an inverse reduced transform.

In some examples, a Reduced Transform (RT) maps an N dimensional vector to an R dimensional vector in a different space, where R/N(R<N) is the reduction factor. The RST matrix is an R×N matrix as follows in formula (2):

$$T_{RxN} = \begin{bmatrix} t_{11} & t_{12} & t_{13} & & t_{1N} \\ & & & \cdots & \\ t_{21} & t_{22} & t_{23} & & t_{2N} \\ & \vdots & & \ddots & \vdots \\ t_{R1} & t_{R2} & T_{R3} & \cdots & t_{RN} \end{bmatrix} \quad (3)$$

where the R rows of the transform are R bases of the N dimensional space. The inverse transform matrix for RT is the transpose of its forward transform. FIG. 12A is a schematic view of forward and transform and FIG. 12B is a schematic view of inverse reduced transform.

The RST8×8 with a reduction factor of 4 (¼ size) can be applied. Hence, instead of 64×64, which is a conventional 8×8 non-separable transform matrix size, a 16×64 direct matrix is used. In other words, the 64×16 inverse RST matrix is used at the decoder side to generate core (primary) transform coefficients in 8×8 top-left regions. The forward RST8×8 uses 16×64 (or 8×64 for 8×8 block) matrices so that the forward RST8×8 produces non-zero coefficients only in the top-left 4×4 region within the given 8×8 region. In other words, if RST is applied then the 8×8 region except the top-left 4×4 region can have only zero coefficients. For RST4×4, 16×16 (or 8×16 for 4×4 block) direct matrix multiplication can be applied.

Figures 13A, 13B:
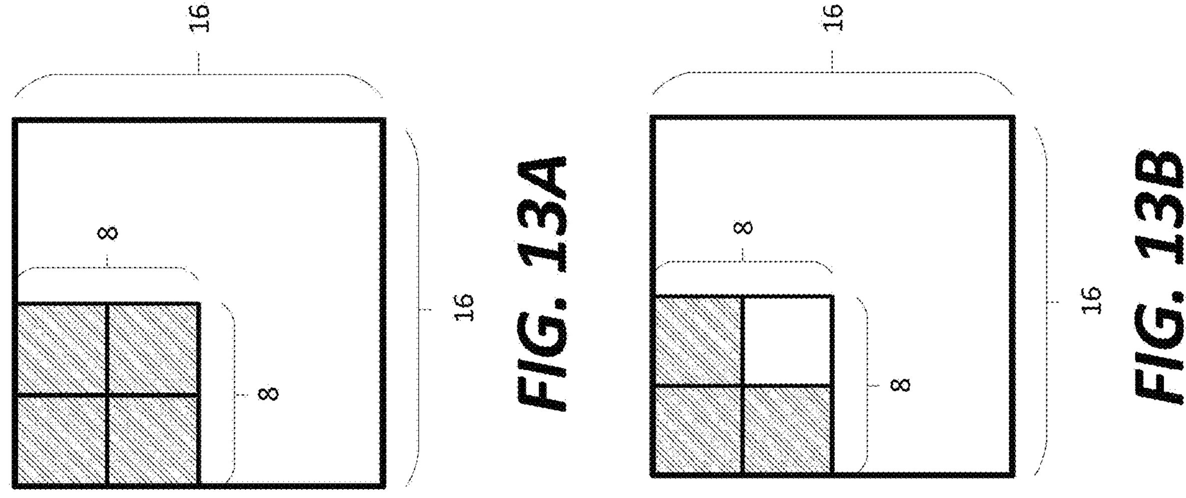
FIG. 13A shows a first embodiment of RST8×8.
FIG. 13B shows a second embodiment of RST8×8.

In addition, for RST8×8, to further reduce the transform matrix size, instead of the using the whole top-left 8×8 coefficients as input for calculating secondary transform, the top-left three 4×4 coefficients are used as the input for calculating secondary transform. FIGS. 13A-13B show different alternatives of RST8×8. FIG. 13A shows example 16×64 transform matrices and the whole top-left 8×8 coefficients are applied as input for calculating secondary transform. FIG. 13B shows example 16×46 transform matrices and the top-left three 4×4 coefficients are used as the input for calculating secondary transform.

In some embodiments, an inverse RST can be conditionally applied when the following two conditions are satisfied: (a) block size is greater than or equal to the given threshold (W>=4 && H>=4); (b) transform skip mode flag is equal to zero.

If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If the RST index is equal to 0, RST is not applied. Otherwise, if RST index is equal to one, RST is applied, of which kernel is chosen with the RST index.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma components. When the ISP mode is selected, RST is disabled, and RST index is not signaled.

In some embodiments, an RST matrix can be chosen from four transform sets, and each of the transform sets consists of two transforms. Which transform set is applied is determined from intra prediction mode as the following: (a) if one of three CCLM modes is indicated, transform set 0 is selected. (b) Otherwise, transform set selection is performed according to Table 7:

TABLE 7

The transform set selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index (i.e., IntraPredMode) to access Table 7 has a range of [−14, 83], which is a transformed mode index used for wide angle intra prediction.

VVC also includes a Matrix-based intra prediction (MIP) mode. For predicting the samples of a rectangular block of width W and height H, MIP takes one line of H reconstructed neighbouring boundary samples that are located at left of the block, and one line of W reconstructed neighbouring boundary samples above the block as input. If the reconstructed samples are unavailable, they are generated as it is done in the conventional intra prediction.

The generation of the prediction signal is based on the following three steps:

(a) Out of the boundary samples, four samples in the case of W=H=4 and eight samples in all other cases are extracted by averaging.

(b) A matrix vector multiplication, followed by addition of an offset, is carried out with the averaged samples as an input. The result is a reduced prediction signal on a subsampled set of samples in the original block.

(c) The prediction signal at the remaining positions is generated from the prediction signal on the sub sampled set by linear interpolation which is a single step linear interpolation in each direction.

The matrices and offset vectors needed to generate the prediction signal are taken from three sets $S_0$, $S_1$, $S_2$ of matrices. The set $S_0$ consists of 18 matrices $$A_0^i, i \in \{0, \ldots, 17\},$$

and each of the matrices has 16 rows, 4 columns and 18 offset vectors $$b_0^i, i \in \{0, \ldots, 17\}.$$

Each of the offset vectors $$b_0^i$$

has a size 16. Matrices and offset vectors of the set $S_0$ are used for blocks of size 4×4. The set $S_1$ consists of 10 matrices $$A_1^i, i \in \{0, \ldots, 9\},$$

each of the matrices has 16 rows, 8 columns and 10 offset vectors $$b_1^i, i \in \{0, \ldots, 9\}.$$

Each of the offset vectors $$b_1^i$$

has a size 16. Matrices and offset vectors of the set $S_1$ are used for blocks of sizes 4×8, 8×4 and 8×8. Finally, the set $S_2$ consists of 6 matrices $$A_2^i, i \in \{0, \ldots, 5\},$$

each of the matrices has 64 rows, 8 columns and 6 offset vectors $$b_2^i, i \in \{0, \ldots, 5\}$$

of size 64. Matrices and offset vectors of the set $S_2$ or parts of these matrices and offset vectors are used for all other block-shapes.

Figure 14:
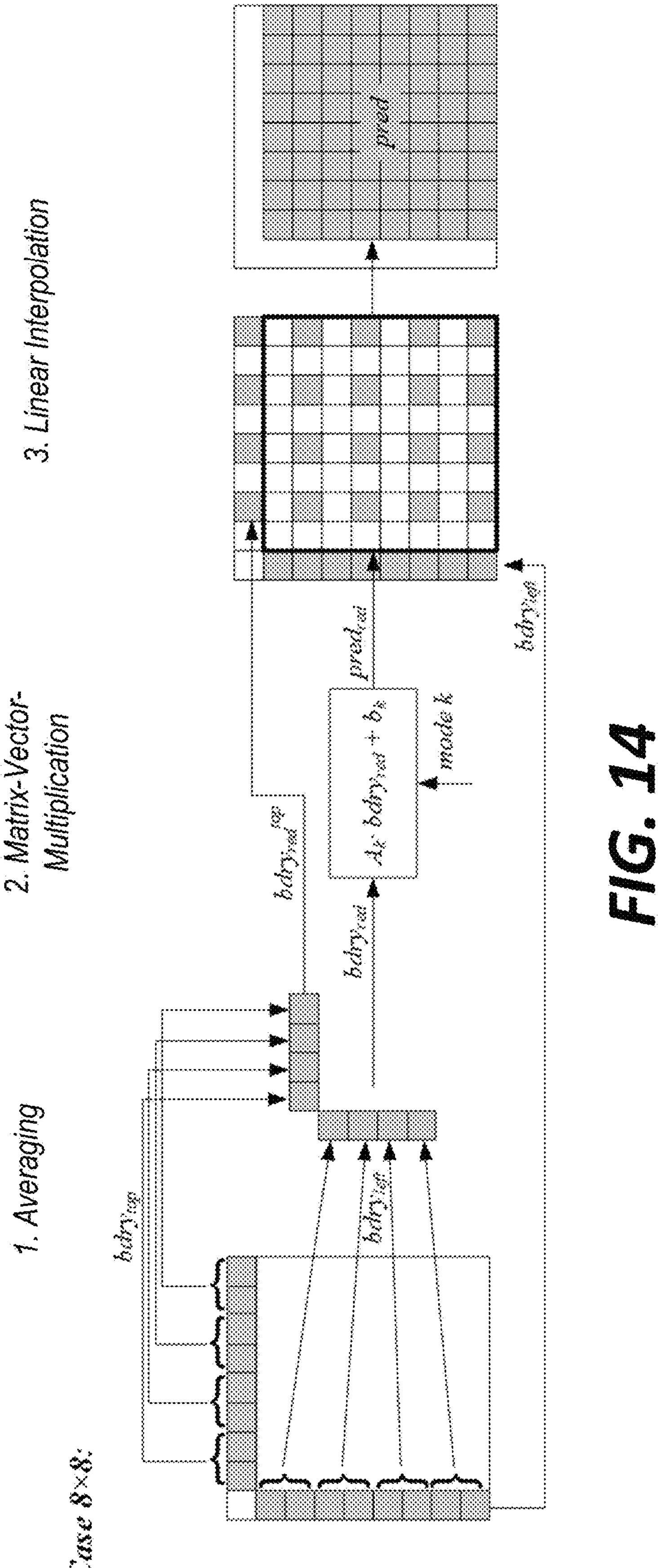
FIG. 14 shows a Matrix-based intra prediction (MIP) mode.

FIG. 14 is an illustration of an example MIP for 8×8 blocks. As shown in FIG. 14, given an 8×8 block, MIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary. The interpolation process does not require any multiplications in this case.

In terms of signaling of MIP mode, for each Coding Unit (CU) in intra mode, a flag indicating whether an MIP mode is applied on the corresponding Prediction Unit (PU) or not is sent in the bitstream. If an MIP mode is applied, the index predmode of the MIP mode is signaled using an MPM-list including 3 MPMs.

Here, the derivation of the MPMs is performed using the intra-modes of the above and the left PU as follows. There are three fixed mapping tables map_angular_to_mip$_{idx}$, idx∈{0,1,2}, and each table associate each conventional intra prediction mode predmode$_{Angular}$ with a specific MIP mode, as described in the following formula (4).

$$\text{predmode}_{MIP}=\text{map\_angular\_to\_mip}[\text{predmode}_{Angular}] \quad (4)$$

where map_angular_to_mip is a fixed look-up table. The index of the mapping table is decided based on the width W and height H of PU, and in total three indices are available, as described below in formula (5)

$$\text{idx}(PU)=\text{idx}(W,H)\in\{0,1,2\} \quad (5)$$

The formula (5) indicates from which of the three sets the MIP parameters are to be taken.

To generate the MPM list for current block which is coded by MIP mode, an above MIP mode, namely $$\text{mode}_{MIP}^{above},$$

and a left MIP mode, namely $$\text{mode}_{MIP}^{left},$$

are firstly derived. The value of $$\text{mode}_{MIP}^{above}$$

derived as follows:

(a) If the above PU PU$_{above}$ is available, and it belongs to the same CTU where the current PU resides, and PU$_{above}$ is coded by MIP using an MIP mode $$predmode_{MIP}^{above}$$

and idx(PU)=idx($PU_{above}$), $$\mathrm{mode}_{MIP}^{above} = predmode_{MIP}^{above} \tag{6}$$

(b) If the above PU $PU_{above}$ is available, and it belongs to the same CTU where the current PU resides, and $PU_{above}$ is coded using a conventional intra prediction mode $$predmode_{Angular}^{above}, \tag{7}$$

$$\mathrm{mode}_{MIP}^{above} = \mathrm{map\_angular\_to\_mip}\left[predmode_{Angular}^{above}\right]$$

(c) Otherwise, $$\mathrm{mode}_{MIP}^{above} = -1 \tag{8}$$

which means that this mode is unavailable. The value of $$\mathrm{mode}_{MIP}^{left}$$

is derived in the same way of deriving $$\mathrm{mode}_{MIP}^{above}$$

but without checking whether the left PU belongs to the same CTU where the current PU resides.

Finally, given the derived $$\mathrm{mode}_{MIP}^{above} \text{ and } \mathrm{mode}_{MIP}^{left}$$

and three pre-defined fixed default MPM lists $list_{idx}$, idx∈{0, 1,2}, where each of the MPM lists contains three distinct MIP modes, an MPM list is constructed. The MPM list is constructed based on the given default list $list_{idx(PU)}$ and $$\mathrm{mode}_{MIP}^{above} \text{ and } \mathrm{mode}_{MIP}^{left},$$

by substituting −1 by default values as well as removing duplicate MIP modes.

The flags signaling MIP modes can be illustrated Table 8 which is a CU-level syntax table.

TABLE 8

Syntax of flags signaling MIP modes at CU-level

| | Descriptor |
|---|---|
| coding_unit( x0, y0, cb Width, cbHeight, treeType ) { | |
| ... ... | |
| if( sps_mip_enabled_flag && | |
| ( Abs( Log2( cbWidth) − Log2(cbHeight)) <= 2) && | |
| cbWidth <= MaxTbSizeY && cbHeight <= MaxTbSize Y ) | |
| intra_mip_flag[ x0 ][ y0 ] | ae(v) |
| if( intra_mip_flag[ x0 ][ y0 ] ) { | |
| intra_mip_mpm_flag[ x0 ][ y0 ] | ae(v) |
| if( intra_mip_mpm_flag[ x0 ][ y0 ] ) | |
| intra_mip_mpm_idx[ x0 ][ y0 ] | ae(v) |
| else | |
| intra_mip_mpm_remainder[ x0 ][ y0 ] | ae(v) |
| } else { | |
| if( sps_mrl_enabled_flag && ( ( y0 % CtbSizeY ) > 0) ) | |
| intra_luma_ref_idx[ x0 ][ y0 ] | ae(v) |
| if ( sps_isp_enabled_flag && intra_luma_ref_idx[ x0 ][ y0 ] = = 0 && | |
| ( cbWidth <= MaxTbSizeY && cbHeight <= MaxTbSize Y ) && | |
| ( cbWidth * cbHeight > MinTbSize Y * MinTbSizeY ) ) | |
| intra_subpartitions_mode_flag[ x0 ][ y0 ] | ae(v) |
| if( intra_subpartitions_mode_flag[ x0 ][ y0 ] = = 1 && | |
| cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] = = 0 && | |
| intra_subpartitions_mode_flag[ x0 ][ y0 ] = = 0) | |
| intra_luma_mpm_flag[ x0 ][ y0 ] | ae(v) |
| if( intra_luma_mpm_flag[ x0 ][ y0 ] ) { | |
| if( intra_luma_ref_idx[ x0 ][ y0 ] = = 0) | |
| intra_luma_not_planar_flag[ x0 ][ y0 ] | ae(v) |
| if( intra_luma_not_planar_flag[ x0 ][ y0 ] ) | |
| intra_luma_mpm_idx[ x0 ][ y0 ] | ae(v) |
| } else | |
| intra_luma_mpm_remainder[ x0 ][ y0 ] | ae(v) |
| } | |
| } | |
| } | |
| ... ... | |

In some embodiments, the MIP modes can be harmonized with the MPM-based coding of the conventional intra-prediction modes as follows. The luma and chroma MPM-list derivation processes for the conventional intra-prediction modes uses separate fixed tables map_mip_to_angular$_{idx}$, idx∈{0,1,4} which map an MIP-mode predmode$_{MIP}$ to one of the conventional intra-prediction modes $$predmode_{Angular}=map\_mip\_to\_angular[predmode_{MIP}] \quad (9)$$

where map_mip_to_angular is a fixed look-up table. For the luma MPM-list derivation, whenever a neighboring luma block is coded by an MIP mode predmode$_{MIP}$, this block is treated as if it was using the conventional intra-prediction mode predmode$_{Angular}$. For the chroma MPM-list derivation, whenever the current luma block uses an MIP-mode, the same mapping is used to translate the MIP-mode to a conventional intra prediction mode.

Although various methods are provided above, there are several disadvantages in the above described methods. For example, currently, when LFNST is applied, sps_mts_enabled_flag is signaled as true, but both sps_explicit_mts_intra_enabled_flag and sps_explicit_mts_inter_enabled_flag are signaled as false. For small block sizes, the primary transform would be selected using the implicit transform scheme as introduced above, which means DST-7 can be always enabled. However, the LFNST kernels may not work very efficiently with DST-7.

In addition, currently, when MIP is applied, sps_mts_enabled_flag is signaled as true, but both sps_explicit_mts_intra_enabled_flag and sps_explicit_mts_inter_enabled_flag are signaled as false. For small block sizes, the primary transform would be selected using the implicit transform scheme as introduced above, which means DST-7 can be always enabled. However, the DST-7 may not work very efficiently with MIP modes.

According to the embodiments of the present disclosure, methods for an improved implicit transformation selection are provided. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following disclosures, the term block may be interpreted as a prediction block, a coding block, or a coding unit, i.e., CU.

According to embodiments of the present disclosure, the term NSST may also refer to Reduced Secondary Transform (RST), which is an alternative design of non-separable secondary transform, e.g., as described in JVET-M0292 or JVET-N0193, it may also refer to Low-Frequency Non-Separable Secondary Transform (LFNST) adopted in VVC Draft v5.

According to embodiments of the present disclosure, DST-7 may be also replaced by DST-4.

According to embodiments of the present disclosure, an "implicit transform" indicates a transform scheme selecting a group of non-DCT2 transforms (such as DST-1, DCT-5, DST-7, DCT-8, DST-4, DCT-4) without any transform index signaling. In this regard, a group of non-DCT2 transform can be selected using already coded information that is available to both encoder and decoder, including but not limited to intra prediction mode (Planar mode, DC mode, Angular modes), block size, block width, block height, block aspect ratio, block area size, intra coding mode (whether MRL, ISP, MIP is used), position of selected spatial Merge candidates (top Merge candidate, left Merge candidate), inter prediction mode (inter-PDPC mode, CIIP mode etc.).

In the following disclosures, an "explicit transform" indicates a transform scheme selecting one transform from a group of transform type candidates (such as DCT-2, DST-1, DCT-5, DST-7, DCT-8, DST-4, DCT-4) with an index signaled to indicate which transform type is selected.

In a first embodiment, the disclosed method includes acquiring transform block signaling information from a coded video bitstream to determine whether an implicit transform scheme is applied for primary transform type selection. When the implicit transform scheme is selected, which means a flag of sps_mts_enabled_flag is signaled as true, and both a flag of sps_explicit_mts_intra_enabled_flag and a flag of sps_explicit_mts_inter_enabled_flag are signaled as false. Moreover, for an W×H block, if a LFNST index (lfnst_idx) is signaled as 0 (i.e., fault), and if a TSM is not enabled, the primary transform is selected using the following algorithm:

(a) Horizontal transform is DST-7 if W>=T1 and W<=T2. Otherwise horizontal transform is DCT-2. Example values of T1 include 2 pixels, 4 pixels, or 8 pixels. Example values of T2 include 4, 8, 16, or 32.

(b) Vertical transform is DST-7 if H>=T1 and H<=T2. Otherwise vertical transform is DCT-2. Example values of T1 include 2, 4, or 8. Example values of T2 include 4, 8, 16, or 32.

On the contrary, in some embodiments, if LFNST index is not signaled as 0 (i.e., LFNST is applied), the primary transform can be selected as follows:

(a) In an example, DCT-2 is always selected.

(b) In another example, a predefined transform type other than DCT-7 is selected, such as Hadamard transform, DST-1, DCT-5, Compound Orthonormal Transform (COT), Karhunen-Loève Transform (KLT).

The changes of the proposed method in the first embodiment on top of VVC Draft v5 can be shown below, and changes are highlighted in bold.

In an example, inputs to the above disclosed method in the first embodiment can be:

(a) a luma location (xTbY, yTbY) specifying the top-left sample of the current luma transform block relative to the top-left luma sample of the current picture, (b) a variable nTbW specifying the width of the current transform block, (c) a variable nTbH specifying the height of the current transform block, (d) a variable cIdx specifying the color component of the current block, and (e) an (nTbW)x(nTbH) array d[x][y] of scaled transform coefficients with x=0 . . . nTbW−1, y=0 . . . nTbH−1.

Corresponding output of the above method in the first embodiment can be the (nTbW)x(nTbH) array r[x] [y] of residual samples with x=0 . . . nTbW−1, y=0 . . . nTbH−1.

The variable implicitMtsEnabled in the first embodiment may be derived as follows:

(a) If sps_mts_enabled_flag is equal to 1 and one of the following conditions is true, implicitMtsEnabled is set equal to 1.

(b) IntraSubPartitionsSplitType is not equal to ISP_NO_SPLIT.

(c) cu_sbt_flag is equal to 1 and Max(nTbW, nTbH) is less than or equal to 32.

(d) sps_explicit_mts_intra_enabled_flag and sps_explicit_mts_inter_enabled_flag are both equal to 0 and CuPredMode[xTbY] [yTbY] is equal to MODE_INTRA and lfnst_idx[x0][y0] is equal to 0.

(e) Otherwise, implicitMtsEnabled is set equal to 0.

The variable trTypeHor specifying the horizontal transform kernel and the variable trTypeVer specifying the vertical transform kernel in the first embodiment may be derived as follows:

(a) If cIdx is greater than 0, trTypeHor and trTypeVer are set equal to 0.

(b) Otherwise, if implicitMtsEnabled is equal to 1, the following applies:

(i) If IntraSubPartitionsSplitType is not equal to ISP_NO_SPLIT or both sps_explicit_mts_intra_enabled_flag and sps_explicit_mts_inter_enabled_flag are equal to 0 and CuPredMode[xTbY] [yTbY] is equal to MODE_INTRA, trTypeHor and trTypeVer are derived as follows:

trTypeHor=(nTbW>=4&& nTbW<=16)?1:0 trTypeVer=(nTbH>=4&& nTbH<=16)?1:0

(ii) Otherwise (cu_sbt_flag is equal to 1), trTypeHor and trTypeVer are specified in Table 10 below depending on cu_sbt_horizontal_flag and cu_sbt_pos_flag.

(iii) Otherwise, trTypeHor and trTypeVer are specified in Table 9 below depending on tu_mts_idx[xTbY] [yTbY].

Tables 9-10 provide specification of of trTypeHor and trTypeVer that are associated with the method in the first embodiment.

TABLE 9

Specification of trTypeHor and trTypeVer depending on tu_mts_idx[ x ][ y ]

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

TABLE 10

Specification of trTypeHor and trType Ver depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

In a second embodiment, when an implicit transform scheme is applied for primary transform type selection (e.g., sps_mts_enabled_flag is signaled as true, but both sps_explicit_mts_intra_enabled_flag and sps_explicit_mts_inter_enabled_flag are signaled as false), for a W×H block with MIP flag (intra_mip_flag) being signaled as 0 (i.e., MIP is not applied), if TSM is not enabled, the primary transform can be selected using the following algorithm:

(a) Horizontal transform is DST-7 if W>=T1 and W<=T2. Otherwise horizontal transform is DCT-2. Example values of T1 include: 2, 4, or 8. Example values of T2 include 4, 8, 16, or 32.

(b) Vertical transform is DST-7 if H>=T1 and H<=T2. Otherwise vertical transform is DCT-2. Example values of T1 include 2, 4, or 8. Example values of T2 include 4, 8, 16, or 32.

When MIP flag is not signaled as 0 (i.e., MIP is applied), in an example, the primary transform uses DCT-2. In another example, the primary transform uses non DST-7, such as Hadamard transform, DST-1, DCT-5, COT, KLT.

Alternatively, when the MIP flag (intra_mip_flag) is not equal to 0 (i.e., MIP is applied), the implicit transform scheme may be still applied. However, the threshold T1 and T2 may be different from the ones used for the implicit transform as introduced above. In an example, T1 equals to 2, T2 equals to 4, or 8. In another example, T1 equals to 4, T2 equals to 4 or 8. In yet another example, T1 equals to 8, T2 equals to 8, 16, or 32. T1 can also equal to 16, T2 equals to 16, or 32.

An example of the changes of proposed method in the second embodiment on top of VVC Draft v5 are shown below, changes are highlighted in bold.

Inputs to the method in the second embodiment can be:

(a) a luma location (xTbY, yTbY) specifying the top-left sample of the current luma transform block relative to the top-left luma sample of the current picture, (b) a variable nTbW specifying the width of the current transform block, (c) a variable nTbH specifying the height of the current transform block, (d) a variable cIdx specifying the color component of the current block, and (e) an (nTbW)x(nTbH) array d[x] [y] of scaled transform coefficients with x=0 . . . nTbW−1, y=0 . . . nTbH−1.

Output of this process is the (nTbW)x(nTbH) array r[x] [y] of residual samples with x=0 . . . nTbW−1, y=0 . . . nTbH−1.

The variable implicitMtsEnabled is derived as follows:

(a) If sps_mts_enabled_flag is equal to 1 and one of the following conditions is true, implicitMtsEnabled is set equal to 1.

(b) IntraSubPartitionsSplitType is not equal to ISP_NO_SPLIT.

(c) cu_sbt_flag is equal to 1 and Max(nTbW, nTbH) is less than or equal to 32.

(d) sps_explicit_mts_intra_enabled_flag and sps_explicit_mts_inter_enabled_flag are both equal to 0 and CuPredMode[xTbY][yTbY] is equal to MODE_INTRA and intra_mip_flag [x0][y0] is equal to 0.

(e) Otherwise, implicitMtsEnabled is set equal to 0.

The variable trTypeHor specifying the horizontal transform kernel and the variable trTypeVer specifying the vertical transform kernel in the second embodiment can be derived as follows:

(a) If cIdx is greater than 0, trTypeHor and trTypeVer are set equal to 0.

(b) Otherwise, if implicitMtsEnabled is equal to 1, the following applies:

(i) If IntraSubPartitionsSplitType is not equal to ISP_NO_SPLIT or both sps_explicit_mts_intra_enabled_flag and sps_explicit_mts_inter_enabled_flag are equal to 0 and CuPredMode[xTbY][ yTbY] is equal to MODE_INTRA, trTypeHor and trTypeVer are derived as follows:

trTypeHor=(nTbW>=4&& nTbW<=16)?1:0 trTypeVer=(nTbH>=4 && nTbH<=16)?1:0

(ii) Otherwise (cu_sbt_flag is equal to 1), trTypeHor and trTypeVer are specified in Table 10 depending on cu_sbt_horizontal_flag and cu_sbt_pos_flag.

(iii) Otherwise, trTypeHor and trTypeVer are specified in Table 9 depending on tu_mts_idx[xTbY] [yTbY].

In a third embodiment, the first embodiment and the second embodiment can be combined, and the spec text changes of proposed method on top of VVC Draft v5 are shown below, changes are highlighted in bold.

Inputs to the method in the third embodiment can be:

(a) a luma location (xTbY, yTbY) specifying the top-left sample of the current luma transform block relative to the top-left luma sample of the current picture, (b) a variable nTbW specifying the width of the current transform block, (c) a variable nTbH specifying the height of the current transform block, (d) a variable cIdx specifying the color component of the current block, and (e) an (nTbW)x(nTbH) array d[x][y] of scaled transform coefficients with x=0 . . . nTbW−1, y=0 . . . nTbH−1.

Output of this process is the (nTbW)x(nTbH) array r[x][y] of residual samples with x=0 . . . nTbW−1, y=0 . . . nTbH−1.

The variable implicitMtsEnabled in the third embodiment can be derived as follows:

(a) If sps_mts_enabled_flag is equal to 1 and one of the following conditions is true, implicitMtsEnabled is set equal to 1.

(b) IntraSubPartitionsSplitType is not equal to ISP_NO_SPLIT.

(c) cu_sbt_flag is equal to 1 and Max(nTbW, nTbH) is less than or equal to 32.

(d) sps_explicit_mts_intra_enabled_flag and sps_explicit_mts_inter_enabled_flag are both equal to 0 and CuPredMode[xTbY][yTbY] is equal to MODE_INTRA and lfnst_idx[x0][y0] is equal to 0 and intra_mip_flag[x0][y0] is equal to 0.

(e) Otherwise, implicitMtsEnabled is set equal to 0.

The variable trTypeHor specifying the horizontal transform kernel and the variable trTypeVer specifying the vertical transform kernel in the third embodiment are derived as follows:

(a) If cIdx is greater than 0, trTypeHor and trTypeVer are set equal to 0.

(b) Otherwise, if implicitMtsEnabled is equal to 1, the following applies:

(i) If IntraSubPartitionsSplitType is not equal to ISP_NO_SPLIT or both sps_explicit_mts_intra_enabled_flag and sps_explicit_mts_inter_enabled_flag are equal to 0 and CuPredMode[xTbY][yTbY] is equal to MODE_INTRA, trTypeHor and trTypeVer are derived as follows:

trTypeHor=(nTbW>=4 && nTbW<=16)?1:0 trTypeVer=(nTbH>=4 && nTbH<=16)?1:0

(ii) Otherwise (cu_sbt_flag is equal to 1), trTypeHor and trTypeVer are specified in Table 10 depending on cu_sbt_horizontal_flag and cu_sbt_pos_flag.

(iii) Otherwise, trTypeHor and trTypeVer are specified in Table 9 depending on tu_mts_idx[xTbY][yTbY].

In a fourth embodiment of the present disclosure, a combination of implicit transform and explicit transform signaling can be applied. For a horizontal (or vertical) transform, either an implicit transform or an explicit transform can be used.

In an example, for a W×H block, if W is greater than or equal to T1 and W is less than or equal to T2, then the horizontal transform type is DST-7. Otherwise, if W is greater than T2 and less than or equal to T3, the horizontal transform type can be either DCT-2 or DST-7 and the selection is signaled. Otherwise, if W is greater than T3 or less than T1, a default transform type, e.g., DCT-2, is applied. Example values of T1 include 2, 4, or 8. Example values of T2 include 4, 8, 16, or 32. Example values of T3 include 8, 16, 32, or 64. A combined setting of T1, T2 and T3 can be that T1 equals to 4 (or 2), T2 equals to 16 and T3 equals to 32 (or 64).

In another example, for a W×H block, if H is greater than or equal to T1 and H is less than or equal to T2, then the vertical transform type is DST-7. Otherwise if H is greater than T2 and less than or equal to T3, the vertical transform type can be either DCT-2 or DST-7 and the selection is signaled. Otherwise, if H is greater than T3 or less than T1, a default transform type, e.g., DCT-2, is applied. Example values of T1 include 2, 4, or 8. Example values of T2 include 4, 8, 16, or 32. Example values of T3 include 8, 16, 32, or 64. A combined setting of T1, T2 and T3 can be that T1 equals to 4 (or 2), T2 equals to 16 and T3 equals to 32 (or 64).

Figure 15:
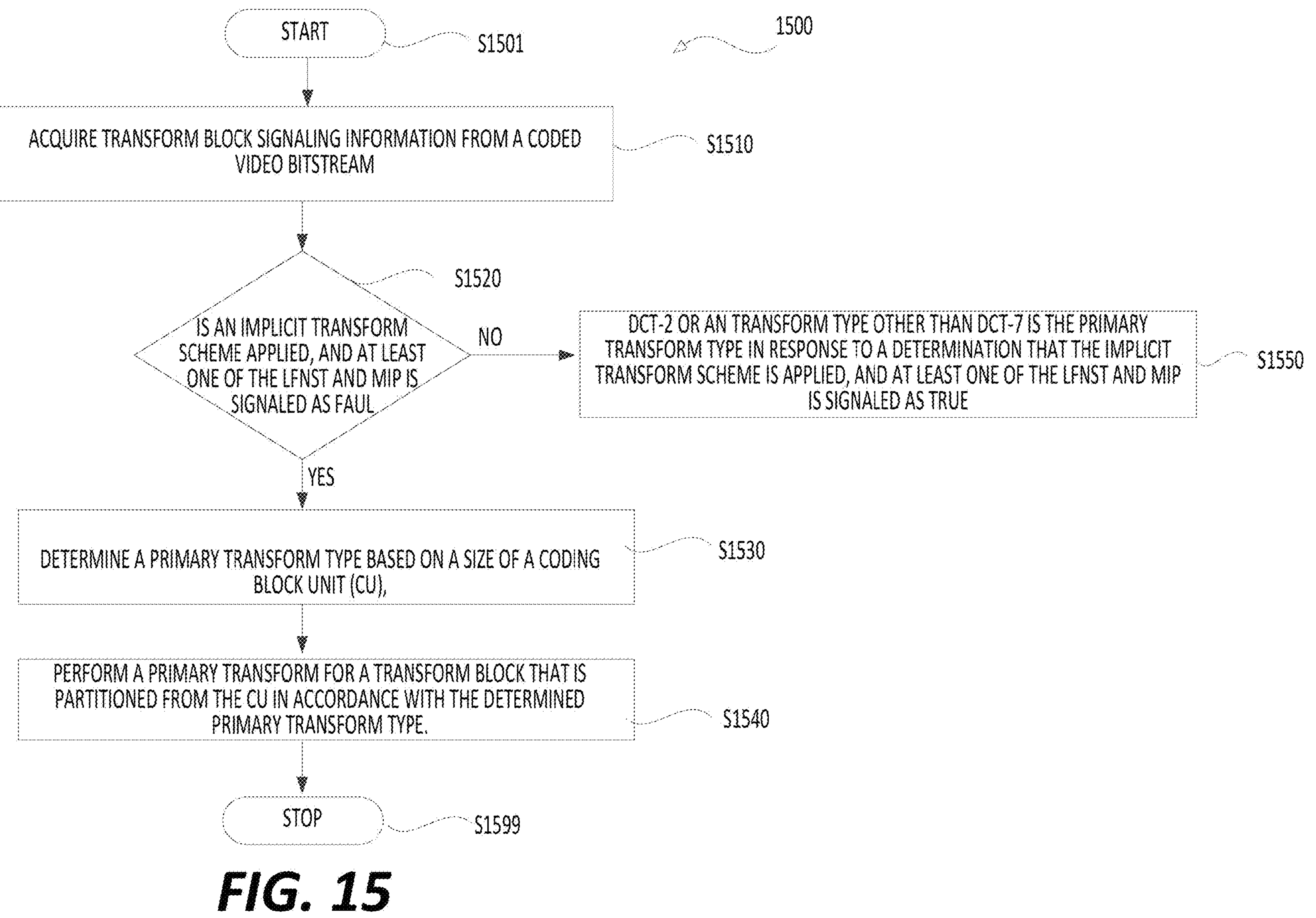
FIG. 15 shows a flow chart outlining a process example according to some embodiments of the disclosure.

FIG. 15 shows a flow chart outlining a process (1500) according to an embodiment of the disclosure. The process (1500) can be used in the reconstruction of a block coded in intra mode, so to generate a prediction block for the block under reconstruction. In various embodiments, the process (1500) can be executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1500) can be implemented in software instructions, thus when the processing circuitry executes the software instructions, the processing circuitry performs the process (1500). The process starts at (S1501) and proceeds to (S1510).

At (S1510), transform block signaling information is acquired from a coded video bitstream. The transform block signaling information can include at least one of a flag of sps_mts_enabled_flag, a flag of sps_explicit_mts_intra_enabled_flag, or a flag of Transform Skip Mode (TSM), or the like. The transform block signaling information can also include a LFNST index (lfnst_idx) or a MIP flag (intra_mip_flag). When the flag of sps_mts_enabled_flag is signaled as true, but both the flag of sps_explicit_mts_intra_enabled_flag and the flag of sps_explicit_mts_inter_enabled_flag are signaled as false, an implicit transform scheme is applied for primary transform type selection.

At (S1520), a determination can be made by the decoder whether the transform block signaling information indicates the implicit transform scheme, and at least one of a low-frequency non-separable transform (LFNST) and a matrix-based intra predication mode (MIP) is fault. If the implicit transform scheme is applied, and at least one of a low-frequency non-separable transform (LFNST) and a matrix-based intra predication mode (MIP) is fault, the process 1500 proceeds to (S1530).

At (S1530), in response to the determination that the transform block signaling information indicates the implicit transform scheme, and at least one of the LFNST and MIP is signaled as fault, a primary transform type is determined based on a size of a coding block unit (CU). The process 1500 then proceeds to (S1540), where a primary transform is performed for a transform block that is partitioned from the CU in accordance with the determined primary transform type.

At (S1520), if the determination is that the implicit transform scheme is applied, but at least one of a low-frequency non-separable transform (LFNST) and a matrix-based intra predication mode (MIP) is true, the process 1500 proceeds to (S1550), where in response to the determination, DCT-2 or a transform type other than DCT-7 can be selected. The transform type other than DCT-7 can include Hadamard transform, DST-1, DCT-5, COT, and KLT.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
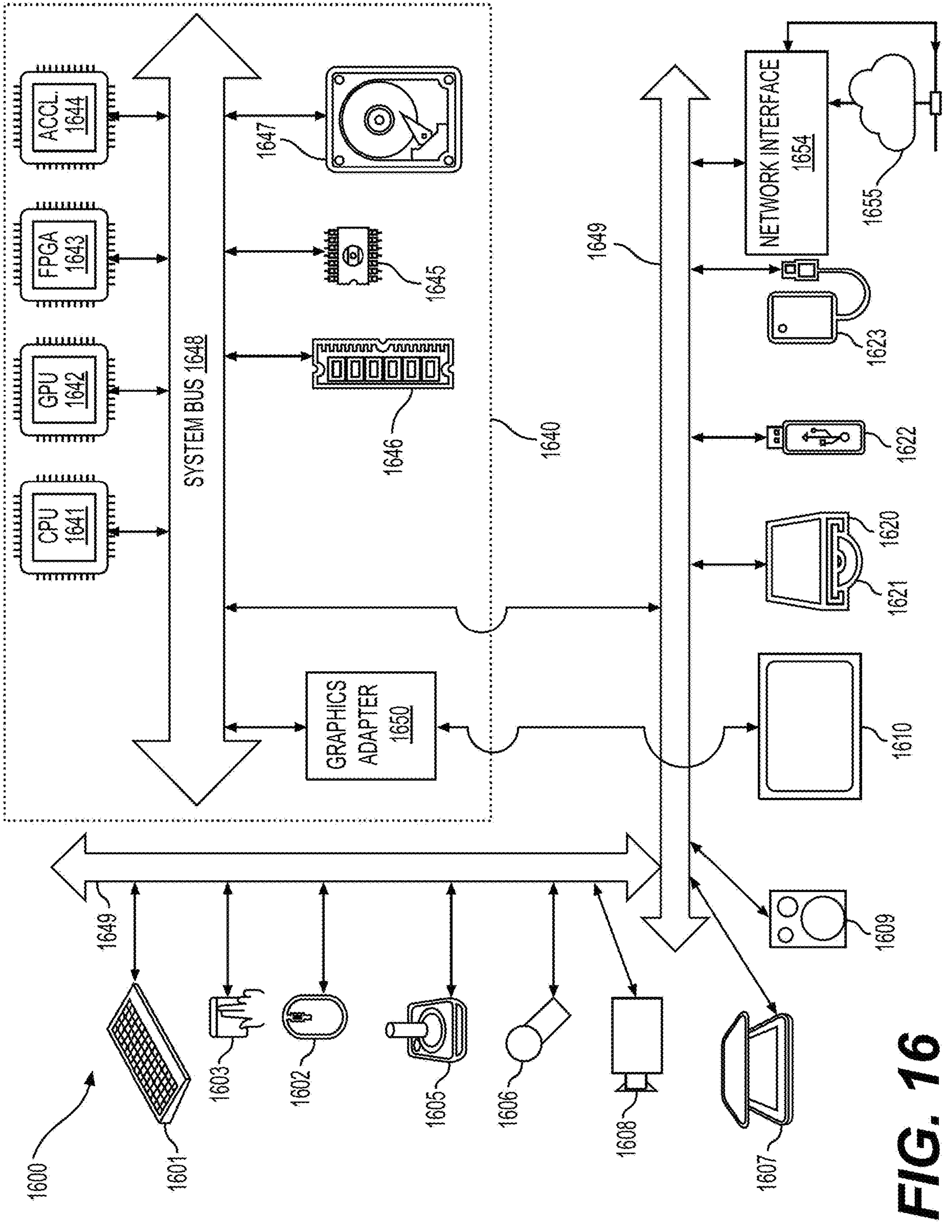
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

| Appendix A: Acronyms |
|---|
| JEM: joint exploration model |
| VVC: versatile video coding |
| BMS: benchmark set |
| MV: Motion Vector |
| HEVC: High Efficiency Video Coding |
| SEI: Supplementary Enhancement Information |
| VUI: Video Usability Information |
| GOPs: Groups of Pictures |
| TUs: Transform Units, |
| PUs: Prediction Units |
| CTUs: Coding Tree Units |
| CTBs: Coding Tree Blocks |
| PBs: Prediction Blocks |
| HRD: Hypothetical Reference Decoder |
| SNR: Signal Noise Ratio |

-continued

| Appendix A: Acronyms |
|---|
| CPUs: Central Processing Units |
| GPUs: Graphics Processing Units |
| CRT: Cathode Ray Tube |
| LCD: Liquid-Crystal Display |
| OLED: Organic Light-Emitting Diode |
| CD: Compact Disc |
| DVD: Digital Video Disc |
| ROM: Read-Only Memory |
| RAM: Random Access Memory |
| ASIC: Application-Specific Integrated Circuit |
| PLD: Programmable Logic Device |
| LAN: Local Area Network |
| GSM: Global System for Mobile communications |
| LTE: Long-Term Evolution |
| CANBus: Controller Area Network Bus |
| USB: Universal Serial Bus |
| PCI: Peripheral Component Interconnect |
| FPGA: Field Programmable Gate Areas |
| SSD: solid-state drive |
| IC: Integrated Circuit |
| CU: Coding Unit |

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A non-transitory computer-readable storage medium storing instructions which, when executed by a processor, cause the processor to perform an encoding method comprising:

determining whether (i) an implicit transform scheme is to be applied to a coding unit (CU), and (ii) at least one of a low-frequency non-separable transform (LFNST) or a matrix-based intra prediction mode (MIP) is invalid; and when the implicit transform scheme is determined to be applied to the CU, and at least one of the LFNST or the MIP is invalid, determining a primary transform type based on a size of the CU;

encoding a transform block that is partitioned from the CU in a bitstream based on the determined primary transform type; and transmitting the encoded bitstream.

2. The non-transitory computer-readable storage medium of claim 1, wherein the bitstream includes transform block signaling information and at least one of LFNST information or MIP information, the transform block signaling information indicating whether the implicit transform scheme is to be applied to the CU, the LFNST information indicating whether the LFNST is invalid, and the MIP information indicating whether the MIP is invalid.

3. The non-transitory computer-readable storage medium of claim 1, wherein the determining the primary transform type further comprises:

determining whether a transform skip mode is enabled; and when the transform skip mode is determined as disabled, (i) determining a transform type DST-7 for a horizontal transform for the transform block when a width of the CU is equal to or greater than T1 and equal to or less than T2;

(ii) determining a transform type DCT-2 for the horizontal transform for the transform block when the width of the CU is less than T1 or greater than T2;

(iii) determining a transform type DST-7 for a vertical transform for the transform block when a height of the CU is equal to or greater than T1 and equal to or less than T2; and (iv) determining a transform type DCT-2 for the vertical transform for the transform block when the height of the CU is less than T1 or greater than T2.

4. The non-transitory computer-readable storage medium of claim 3, wherein the T1 is equal to 2 pixels, 4 pixels, or 8 pixels, and T2 is equal to 4 pixels, 8 pixels, 16 pixels, or 32 pixels.

5. The non-transitory computer-readable storage medium of claim 1, wherein:

when the implicit transform scheme is determined to be applied to the CU and at least one of the LFNST or the MIP is valid, the encoding method further comprises one of:

determining a first transform type DCT-2 for the transform block; and determining a second transform type that is not DCT-7 for the transform block, the second transform type including at least one of Hadamard transform, DST-1, DCT-5, compound orthonormal transform (COT), or Karhunen-Loeve transform.

6. The non-transitory computer-readable storage medium of claim 1, wherein:

when the implicit transform scheme is determined to be applied to the CU, and the MIP is not applied to the transform block, the encoding method further comprises one of:

(i) determining a transform type DST-7 for a horizontal transform for the transform block when a width of the CU is equal to or greater than T1 and equal to or less than T2;

(ii) determining a transform type DCT-2 for the horizontal transform for the transform block when the width of the CU is less than T1 or greater than T2;

(iii) determining a transform type DST-7 for a vertical transform for the transform block when a height of the CU is equal to or greater than T1 and equal to or less than T2; and (iv) determining a transform type DCT-2 for the vertical transform for the transform block when the height of the CU is less than T1 or greater than T2.

7. The non-transitory computer-readable storage medium of claim 6, wherein the T1 and T2 indicate at least one of:

T1 is equal to 2 pixels, and T2 is equal to 4 pixels or 8 pixels;

T1 is equal to 4 pixels, and T2 is equal to 4 pixels or 8 pixels;

T1 is equal to 8 pixels, and T2 is equal to 8 pixels, 16 pixels, or 32 pixels; or T1 is equal to 16 pixels, and T2 is equal to 16 pixels or 32 pixels.

8. The non-transitory computer-readable storage medium of claim 1, wherein the encoding method further comprises one of:

when the implicit transform scheme is determined to be applied to the CU and neither the LFNST nor the MIP is applied to the transform block, (i) determining a transform type DST-7 for a horizontal transform for the transform block when a width of the CU is equal to or greater than T1 and equal to or less than T2;

(ii) determining a transform type DCT-2 for the horizontal transform for the transform block when the width of the CU is less than T1 or greater than T2;

(iii) determining a transform type DST-7 for a vertical transform for the transform block when a height of the CU is equal to or greater than T1 and equal to or less than T2; and (iv) determining a transform type DCT-2 for the vertical transform for the transform block when the height of the CU is less than T1 or greater than T2.

9. A method of video encoding, the method comprising:

determining whether (i) an implicit transform scheme is to be applied to a coding unit (CU), and (ii) at least one of a low-frequency non-separable transform (LFNST) or a matrix-based intra prediction mode (MIP) is invalid; and when the implicit transform scheme is determined to be applied to the CU, and at least one of the LFNST or the MIP is invalid, determining a primary transform type based on a size of the CU; and encoding a transform block that is partitioned from the CU in a bitstream based on the determined primary transform type.

10. The method of claim 9, wherein the bitstream includes transform block signaling information and at least one of LFNST information or MIP information, the transform block signaling information indicating whether the implicit transform scheme is to be applied to the CU, the LFNST information indicating whether the LFNST is invalid, and the MIP information indicating whether the MIP is invalid.

11. The method of claim 9, wherein the determining the primary transform type further comprises:

determining whether a transform skip mode is enabled; and when the transform skip mode is determined as disabled, (i) determining a transform type DST-7 for a horizontal transform for the transform block when a width of the CU is equal to or greater than T1 and equal to or less than T2;

(ii) determining a transform type DCT-2 for the horizontal transform for the transform block when the width of the CU is less than T1 or greater than T2;

(iii) determining a transform type DST-7 for a vertical transform for the transform block when a height of the CU is equal to or greater than T1 and equal to or less than T2; and (iv) determining a transform type DCT-2 for the vertical transform for the transform block when the height of the CU is less than T1 or greater than T2.

12. The method of claim 11, wherein the T1 is equal to 2 pixels, 4 pixels, or 8 pixels, and T2 is equal to 4 pixels, 8 pixels, 16 pixels, or 32 pixels.

13. The method of claim 9, wherein:

when the implicit transform scheme is determined to be applied to the CU and at least one of the LFNST or the MIP is valid, the method further comprises one of:

determining a first transform type DCT-2 for the transform block; and determining a second transform type that is not DCT-7 for the transform block, the second transform type including at least one of Hadamard transform, DST-1, DCT-5, compound orthonormal transform (COT), or Karhunen-Loeve transform.

14. The method of claim 9, wherein:

when the implicit transform scheme is determined to be applied to the CU, and the MIP is not applied to the transform block, the method further comprises one of:

(i) determining a transform type DST-7 for a horizontal transform for the transform block when a width of the CU is equal to or greater than T1 and equal to or less than T2;

(ii) determining a transform type DCT-2 for the horizontal transform for the transform block when the width of the CU is less than T1 or greater than T2;

(iii) determining a transform type DST-7 for a vertical transform for the transform block when a height of the CU is equal to or greater than T1 and equal to or less than T2; and (iv) determining a transform type DCT-2 for the vertical transform for the transform block when the height of the CU is less than T1 or greater than T2.

15. The method of claim 14, wherein the T1 and T2 indicate at least one of:

T1 is equal to 2 pixels, and T2 is equal to 4 pixels or 8 pixels;

T1 is equal to 4 pixels, and T2 is equal to 4 pixels or 8 pixels;

T1 is equal to 8 pixels, and T2 is equal to 8 pixels, 16 pixels, or 32 pixels;

or T1 is equal to 16 pixels, and T2 is equal to 16 pixels or 32 pixels.

16. The method of claim 9, wherein:

when the implicit transform scheme is determined to be applied to the CU and neither the LFNST nor the MIP is applied to the transform block, the method further comprises one of:

(i) determining a transform type DST-7 for a horizontal transform for the transform block when a width of the CU is equal to or greater than T1 and equal to or less than T2;

(ii) determining a transform type DCT-2 for the horizontal transform for the transform block when the width of the CU is less than T1 or greater than T2;

(iii) determining a transform type DST-7 for a vertical transform for the transform block when a height of the CU is equal to or greater than T1 and equal to or less than T2; and (iv) determining a transform type DCT-2 for the vertical transform for the transform block when the height of the CU is less than T1 or greater than T2.

17. A method of video decoding, the method comprising:

acquiring transform block signaling information from a coded video bitstream;

determining whether (i) the transform block signaling information indicates an implicit transform scheme, and (ii) at least one of a low-frequency non-separable transform (LFNST) or a matrix-based intra prediction mode (MIP) is invalid; and when the transform block signaling information indicates the implicit transform scheme, and at least one of the LFNST or MIP is signaled as invalid, (i) determining a primary transform type based on a size of a coding unit (CU), and (ii) performing a primary transform on a transform block that is partitioned from the CU based on the determined primary transform type.

18. The method of claim 17, wherein determining the primary transform type comprises:

determining whether a transform skip mode is enabled; and when the transform skip mode is determined as disabled, (i) determining a transform type DST-7 for a horizontal transform for the transform block when a width of the CU is equal to or greater than T1 and equal to or less than T2;

(ii) determining a transform type DCT-2 for the horizontal transform for the transform block when the width of the CU is less than T1 or greater than T2;

(iii) determining a transform type DST-7 for a vertical transform for the transform block when a height of the CU is equal to or greater than T1 and equal to or less than T2; and (iv) determining a transform type DCT-2 for the vertical transform for the transform block when the height of the CU is less than T1 or greater than T2.

19. The method of claim 18, wherein the T1 is equal to 2 pixels, 4 pixels, or 8 pixels, and T2 is equal to 4 pixels, 8 pixels, 16 pixels, or 32 pixels.

20. The method of claim 17, wherein:

when the transform block signaling information indicates the implicit transform scheme, and at least one of the LFNST or the MIP is signaled as valid, the method further comprises one of:

(i) determining a first transform type DCT-2 for the transform block; and (ii) determining a second transform type that is not DCT-7 for the transform block, the second transform type including at least one of Hadamard transform, DST-1, DCT-5, compound orthonormal transform (COT), or Karhunen-Loeve transform.

* * * * *